(12) United States Patent
Tavares

(10) Patent No.: US 10,861,347 B2
(45) Date of Patent: Dec. 8, 2020

(54) DEVICE AND METHOD FOR TEACHING PHONICS USING A TOUCH DETECTING INTERFACE

(71) Applicant: Alex B. Tavares, East Greenwich, RI (US)

(72) Inventor: Alex B. Tavares, East Greenwich, RI (US)

( * ) Notice: Subject to any disclaimer, the term of this patent is extended or adjusted under 35 U.S.C. 154(b) by 157 days.

(21) Appl. No.: 15/865,183

(22) Filed: Jan. 8, 2018

(65) Prior Publication Data
US 2018/0197433 A1     Jul. 12, 2018

Related U.S. Application Data

(60) Provisional application No. 62/443,630, filed on Jan. 6, 2017, provisional application No. 62/509,735, filed on May 23, 2017.

(51) Int. Cl.
| G09B 17/00 | (2006.01) |
| G09B 21/00 | (2006.01) |
| G09B 5/06 | (2006.01) |
| G06F 3/0354 | (2013.01) |

(52) U.S. Cl.
CPC ....... *G09B 17/006* (2013.01); *G06F 3/03547* (2013.01); *G09B 5/06* (2013.01); *G09B 5/065* (2013.01); *G09B 21/007* (2013.01)

(58) Field of Classification Search
None
See application file for complete search history.

(56) References Cited

U.S. PATENT DOCUMENTS

| 7,862,415 B1* | 1/2011 | Ghaly | A63F 9/0613 463/9 |
| 2002/0090596 A1* | 7/2002 | Sosoka | G09B 17/006 434/167 |
| 2005/0099307 A1* | 5/2005 | Gilfix | A61H 3/061 340/573.1 |
| 2011/0302519 A1* | 12/2011 | Fleizach | G06F 3/03547 715/773 |
| 2015/0348360 A1* | 12/2015 | Amos | G07F 17/3213 463/20 |
| 2015/0356881 A1* | 12/2015 | Butler | G09B 17/006 434/169 |

* cited by examiner

*Primary Examiner* — Jason T Yen
(74) *Attorney, Agent, or Firm* — Barlow, Josephs & Holmes, Ltd.

(57) ABSTRACT

A device with a tactile surface is operative for teaching phonics and improving literacy. The device includes a plurality of tiles with each tile comprising a grapheme and a touchable surface. An interface array is configured to receive at least one tile of the plurality of tiles. A control device is in electrical communication with the interface array and a media output and is configured to detect the tiles in the array, identify the tile, and convey the tile identifier to the media output.

17 Claims, 27 Drawing Sheets

DEVICE AND METHOD FOR TEACHING PHONICS USING A TOUCH DETECTING INTERFACE

CROSS-REFERENCE TO RELATED APPLICATIONS

The present application claims the benefit of U.S. Provisional Application No. 62/443,630, filed Jan. 6, 2017, the entire contents of which are herein incorporated by reference. The present application also claims the benefit of U.S. Provisional Application No. 62/509,735, filed May 23, 2017, the entire contents of which are also incorporated herein by reference.

FIELD OF THE INVENTION

The present invention is generally related to phonics teaching devices, and more particularly is related to a device with a tactile surface for teaching phonics, literacy, Braille, numeracy, mathematics, music, computer coding, word-object association, and other concepts.

BACKGROUND OF THE INVENTION

Illiteracy is a widespread problem. Existing means of teaching reading require a tremendous amount of one-on-one time from expert instructors (teachers, tutors, parents, etc.). This time is scarce, especially for students of low socioeconomic status, and for students with physical and specific learning disabilities (such as blindness and dyslexia). Furthermore, much of what is known about language acquisition is often ignored in current phonics programs: the programs are instructionist, and often scripted. While high-quality, scripted phonics instruction may be effective, it is often inaccessible to English language learners, and students with specific learning disabilities, for example, working memory issues, dyslexia, and ADHD. The verbosity of the scripts used in such systems often confuses even highly intelligent native speakers learning phonics.

For example, a typical phonics script for teaching a child the sound that the letter 'm' makes, might read: "This is the letter 'm' it says/mmm/. When I touch under the 'm', I say/mmm/. Start on the left side and when you move your finger under the 'm' say/mmm/. When your finger is no longer under the 'm', stop saying/mmm/". Looking at this longwinded description, it is no wonder that so many people have negative memories associated with learning phonics, and no wonder that so many people never successfully learn to read, especially those without access to patient, expert teachers with sufficient time, for example, students in schools with high student-to-teacher ratios. This problem is particularly salient for Blind students learning Braille and contracted Braille: such students initially need constant, one-on-one instruction from a teacher who is not only a literacy instructor, but also a Braille instructor. As use of Braille declines, statistics show that, among the Blind, rates of unemployment are higher for those who do not know how to use Braille (97% of Blind adults who don't use Braille are unemployed).

The phonemic code (letter/sound correspondence) is taught instructively in grades K–1 (and beyond, as often needed). Instructivist teaching of the phonemic code introduces countless complications of convoluted pedagogy, regional accents (short 'i' vs. short 'e', where the words pin and pen are pronounced the same way, as an undifferentiable amalgamation of the two words), and improper instruction due to incorrect and/or inconsistent pronunciation. The brains of children are fundamentally different from those of adults with respect to language acquisition: one does not teach children how to speak and understand language; children acquire language during sensitive periods of development.

Just as children may learn the alphabet song through repeatedly listening to a CD, or the letter names by playing with a toy that sounds the letter name when letters are pressed, children may learn the letter sounds by playing with a toy that plays the sounds when the child interacts with the corresponding letter. To teach one-to-one correspondence (which is prerequisite to teaching the phonemic code), children must learn that each letter has a corresponding sound or sounds, and that each sound may be represented by one or more letters. Preferably, this is done in a way so that the letter sounds are heard when and only when the child interacts with a single letter (one-to-one correspondence).

Devices that passively play letter sounds are not instructive to children. Devices that have children interacting in complicated ways that do not correspond to the way children read, for example, by sliding sliders or pushing down on letters, or that elicit diverse outputs to a single user input for example, identifying a letter's name, sound(s), and words beginning with the letter at the same time, may obfuscate one-to-one correspondence, the mastery of which being prerequisite to conceptualizing the phonemic code.

Learning letter sounds is fundamentally different from learning letter names, insofar as children must also learn that letter sounds can combine to create words, and that words may be decomposed (segmented) into their individual letter sounds. Learning 26 letter sounds is insufficient for learning phonics, as these letters actually combine to create a far greater number of phonemes than the current available toys represent.

Additionally, a large body of research supports the use of manipulatives in teaching mathematical concepts. However, the way to ensure that the use of manipulatives by a student is correct is for a teacher/expert to inspect the work of the student and provide feedback—a time-consuming endeavor. While manipulatives are widely used in school and home settings to teach various concepts, the work that a child performs with manipulatives is typically not verified by a teacher or caretaker, and may often be misguided and/or incorrect. Some experts suggest that extensive use of tablets and smartphones is actually detrimental to child development, and that hands-on experience with physical manipulatives should be a primary mode of learning for a child. Additionally, in many rural areas where electricity is inconsistent, tablets are not a reliable instructional tool, due to their current low-battery life, and high cost.

Additionally, as computer-based thinking is lauded among those new skills that may be the most important $21^{st}$ century skills for students entering a now-unknown job market, children are being taught the fundamentals of computer coding at younger and younger ages. Block-based programming languages, such as Scratch, provide a method of coding that resembles building with physical manipulatives; however, such approaches still rely upon a facility with computers or tablets, and do not allow users to utilize physical manipulatives in a way that aligns with the large body of research which supports learning with physical manipulatives to be optimal for the learning of young students. The teaching systems that currently exist often have students pushing buttons and turning knobs, neither of which is optimally salient.

Additionally, teaching young children music notation (notes, rests, time signatures, etc.), requires either in-person teaching from an expert, or reliance on passive media (such as video instruction), or interaction, but with non-moveable objects, such as within computer programs or apps (thereby disregarding the literature which demonstrates the superior efficacy of manipulative-based learning).

In impoverished areas throughout the world, only the most inexpensive of tools are employed. Currently, no such tool exists for teaching phonics independent of expert teachers, which is particularly detrimental to students who are blind.

Thus, a heretofore unaddressed need exists in the industry to address the aforementioned deficiencies and inadequacies.

BRIEF DESCRIPTION OF THE DRAWINGS

Many aspects of the invention may be better understood with reference to the following images. The components in the images are not necessarily to scale, emphasis instead being placed upon clearly illustrating the principles of the present invention. Moreover, in the images, like reference numerals designate corresponding parts throughout the several views.

DEFINITIONS

As used within this disclosure, "swiping" generally refers to moving, for example, with a finger, along a conductive surface in a continuous, linear motion, for example, in a horizontal or vertical direction, upon a tile.

As used within this disclosure, "scrubbing" generally refers to moving, for example, with a finger, along a conductive surface in a continuous, linear motion, for example, in a horizontal or vertical direction, upon a tile.

As used within this disclosure, a "manipulative" generally refers to a physical object, for example, an object that may be physically manipulated and/or handled by a user.

As used within this disclosure, "tile" generally refers to a manipulative, for example, a manipulative with letters, symbols, numbers, Braille and/or other representations of information printed, embossed, engraved, or otherwise represented on it.

As used within this disclosure, "contracted Braille" generally refers to a system for shortening words so that they take up less physical space, which is used on ADA compliant Braille signs.

As used within this disclosure, "Scratch" refers to a block-based programming language developed by Mitch Resnick at MIT.

DETAILED DESCRIPTION

The embodiments of the present invention described herein are generally related to phonics teaching devices, and more particularly are related to a phonics/Braille/word/concept/language/number/mathematical symbol/music/programming teaching device having moveable tiles that are able to be used individually or arranged to construct words/mathematical equations or inequalities/sentences or musical measures or computer program code and interacted with via touch, for example, via camera-captured measurements of user and manipulative location and movement, or capacitive/resistive touch and/or proximity sensing, for example, in a swiping/scrubbing motion akin to tracking words/speech sounds with a finger when reading or sounding out words.

Embodiments of the present invention relate to a device for the articulation, visualization, and tactile, for example, Braille, feedback of speech sounds (phonemes), names, letter names, and construction of words, concepts, sentences, and mathematical symbols, expressions, equations, and inequalities, musical notation, and computer code, by touch activation, for example, in a linear swiping/tracking that mimics tracking words/symbols of a language, and/or proximity sensing, using moveable, physical objects that may be marked by graphemes, numbers, symbols, text, Braille, pictures, musical notation, raised/embossed traces, or other visual, auditory, or tactile markers, and the like. The embodiments may use camera-captured data, or electrical measures, for example, resistive sensing and/or capacitive sensing, or data stored and transmitted, for example, via RFID, to measure user interaction and tile identification.

Figure 26:
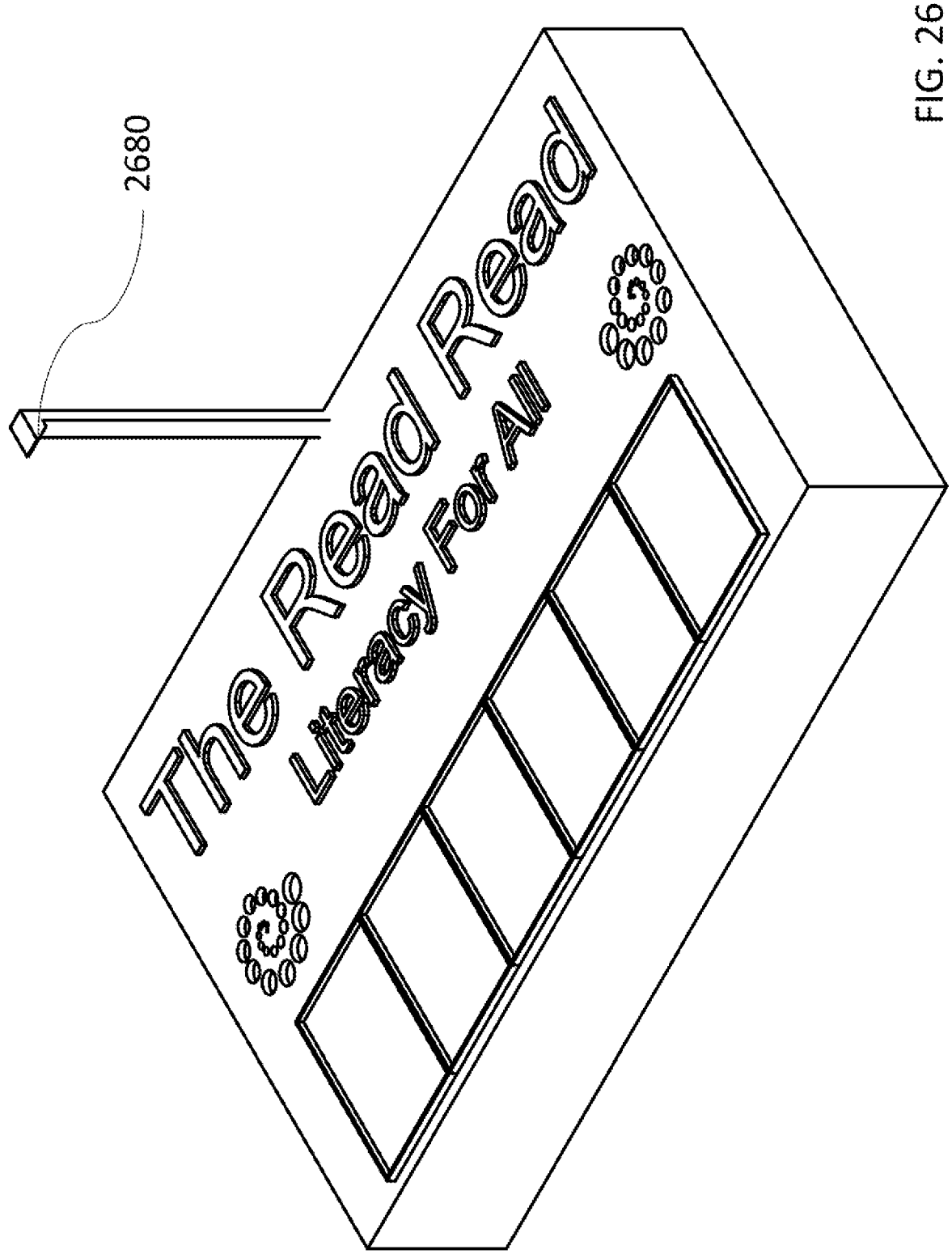
FIG. 26 is a schematic drawing of a fifth embodiment showing a camera that can collect visual data to determine the identity of a tile and when a user is touching a tile.

It should be noted that while the present description provides the example of the device having a system of interchangeable tiles which are activated by touch and/or proximity interaction via measures of capacitance or resistivity (also referred to herein as Mere Touch Tile Interface; also referred to herein as MTTI), the manipulatives may be interacted with or identified by other means, for example, by automatic identification and data capture (AIDC), for example, radio-frequency identification (RFID) 710 (FIG. 7), bar code scanning, magnetic stripe readers, Optical character recognition (OCR) 2680 (FIG. 26), or integrated circuit card readers, or radio communication, for example, Bluetooth, and/or via visual data collected by a video and/or infrared camera 2680 (FIG. 26), being used as a device for learning phonics. The content and design of the tiles and the arrangement and design of the input array is not limited to a device for learning phonics or to the embodiments herein described, but instead, may be used for other devices and systems, for example, in any device that benefits from having a system of interchangeable tiles which are activated by touch interaction and/or any device that benefits from the measure of a user's finger movement along or near an object or objects, as measured, for example, by capacitance, resistivity, video 2680 (FIG. 26), or other means, for example by automatic identification and data capture (AIDC), for example, radio-frequency identification (RFID) 710 (FIG. 7), bar code scanning, magnetic stripe readers, or radio communication, for example, Bluetooth, and/or via visual data collected by a video and/or infrared camera 2680 (FIG. 26).

Figure 1:
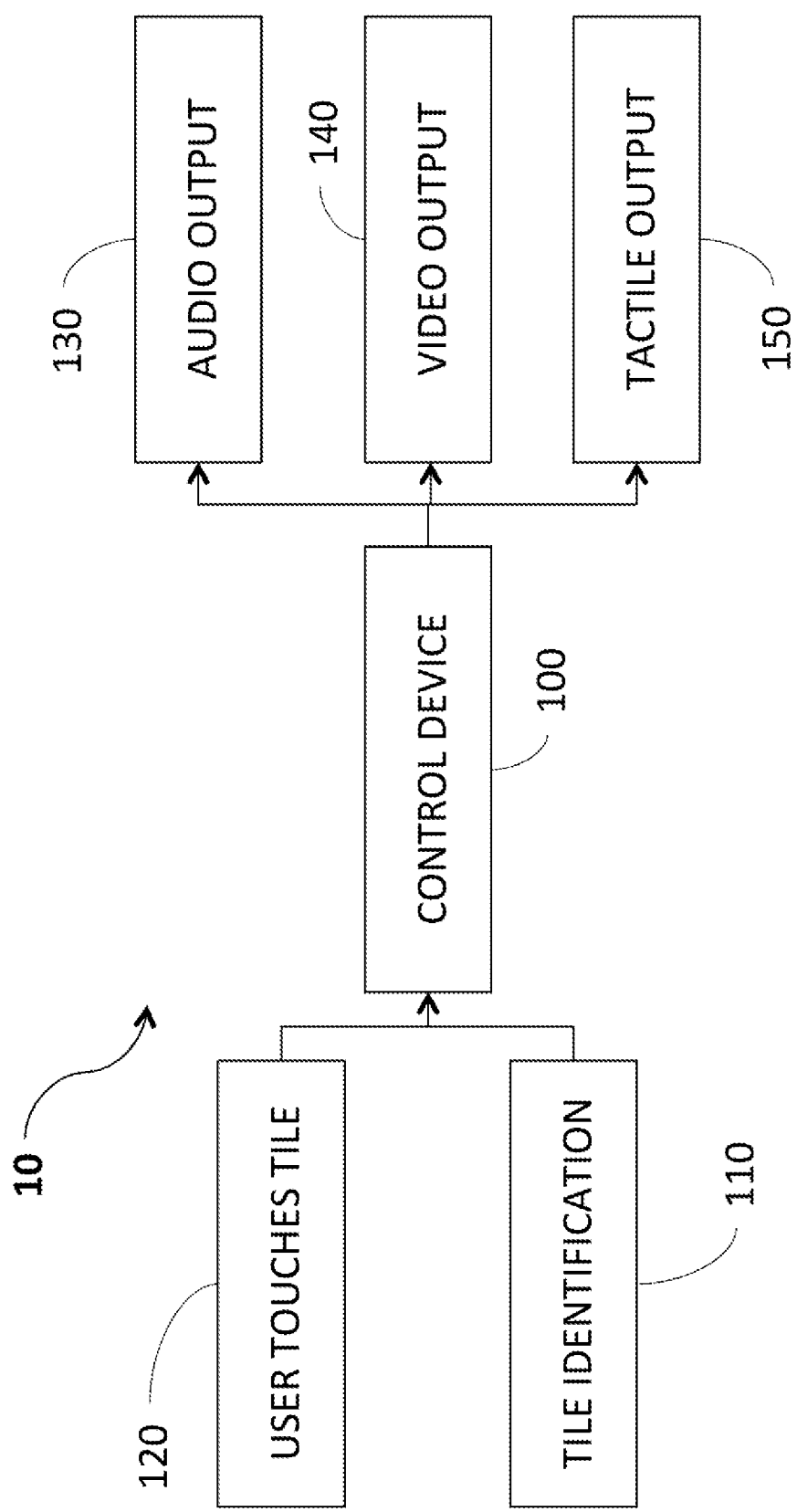
FIG. 1 is a simplified schematic functional block diagram representing the inputs, processing, and outputs of a first embodiment of a device for teaching phonics.
Figure 2:
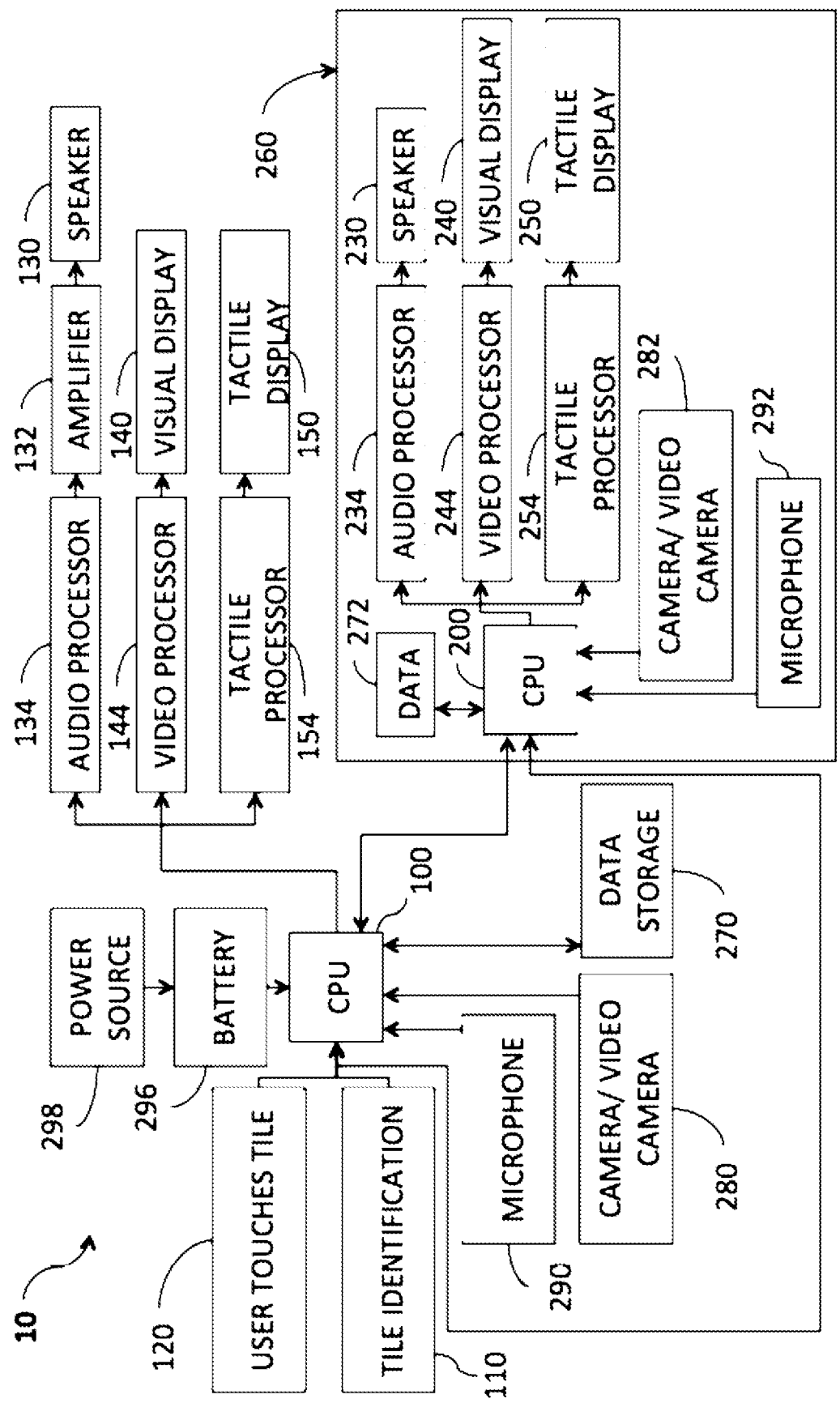
FIG. 2 is a schematic functional block diagram of the device of FIG. 1, representing its inputs, outputs, and processing.

FIG. 1 is a simplified schematic functional block diagram showing an input of a tile identification 110, an input of a user touching a tile 120, processing via a control device 100, an audio output 130, a video output 140, and a tactile output 150 of a first embodiment of the present device 10. The input of a user touching a tile 120 may be implemented, for example by the touching of a tile 816 (FIG. 8), or the proximity to a tile, by a user 120, 1020 (FIG. 10), measured by measures of capacitance and/or resistivity or measures of changes in capacitance and/or resistivity, and/or via visual data collected by a video camera 280 (FIG. 2), 2680 (FIG. 26), or by a video camera 282 (FIG. 2) on an external device 260 (FIG. 2). The identification of the tile 110 may occur via the same modality as the measure of user interaction 120, for example, measures of capacitance and/or resistivity or measures of changes in capacitance and/or resistivity, or by other means, such as the physical depression of pins 1710 (FIG. 17) by protrusions in tiles 2144 (FIG. 21), 2146 (FIG. 21), that complete circuits to identify the tiles 815 (FIG. 8), or by automatic identification and data capture (AIDC), for example, radio-frequency identification (RFID) 703 (FIG. 7), bar code scanning, magnetic stripe readers, Optical character recognition (OCR) 2680 (FIG. 26), or integrated circuit card readers, or radio communication, for example, Bluetooth, and/or via visual data collected by a video and/or infrared camera 280 (FIG. 2). The control device 100 may be pre-programmed and may be reprogrammed by the user or another agent such that interaction with certain tiles 816 (FIG. 8) and/or combinations of tiles 815 (FIG. 8) may elicit one or more events, such as the playing or stopping of an audio file 130, the playing or stopping of a video file 140, or the display or retraction of a refreshable tactile output display, for example, a refreshable Braille display or other tactile output 150.

FIG. 2 is a schematic functional block diagram of the first embodiment 10. The elements of the block diagram may broadly be characterized as inputs 110, 120, 260, 270, 280, 290, 296, 298, outputs 130, 140, 150, 260, 270, and processing 100, 132, 134, 144, 154, 200 elements. The touching of the tile 816 (FIG. 8) by the user 120, 1020 (FIG. 10) may be measured by a video camera 280, measures of capacitance and/or resistivity or measures of changes in capacitance and/or resistivity, for example, by a capacitance or resistance sensor 2456 (FIG. 24), and/or by measuring the delay in program ticks from the sending and receiving of a signal passing through a resistor ranging from about 100 kilohm to 50 megaohm (preferably 1 megohm for absolute touch, and lesser resistor values for proximity sensing) and grounded in parallel with a capacitor ranging from about 10 pF-0.01 µF (dependent upon the resistor value; a 100 pF capacitor is preferred for the ideal 1 megohm resistor), or by other means.

Figure 12:
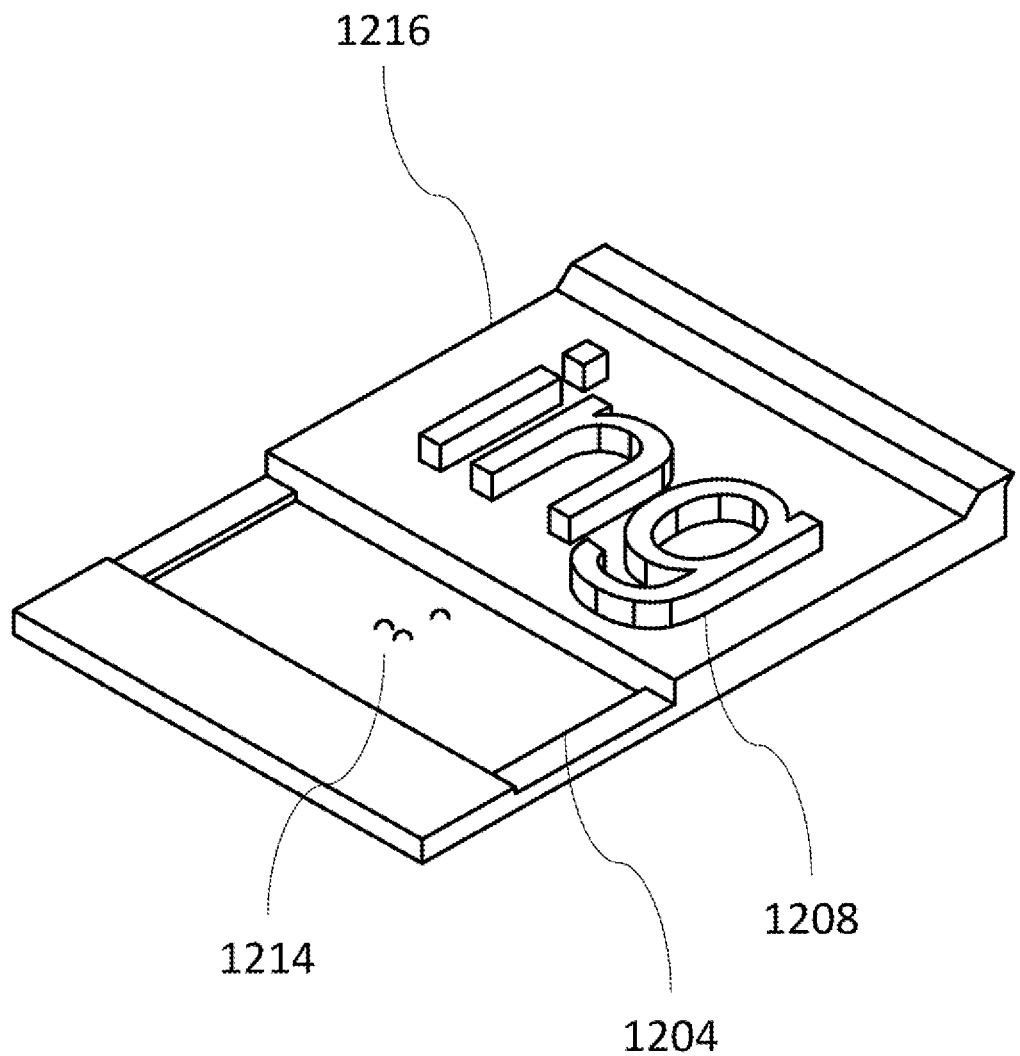
FIG. 12 is a schematic drawing of the second embodiment showing a tile labeled with the grapheme 'ing' and the contracted Braille representation of the grapheme 'ing'.
Figure 13:
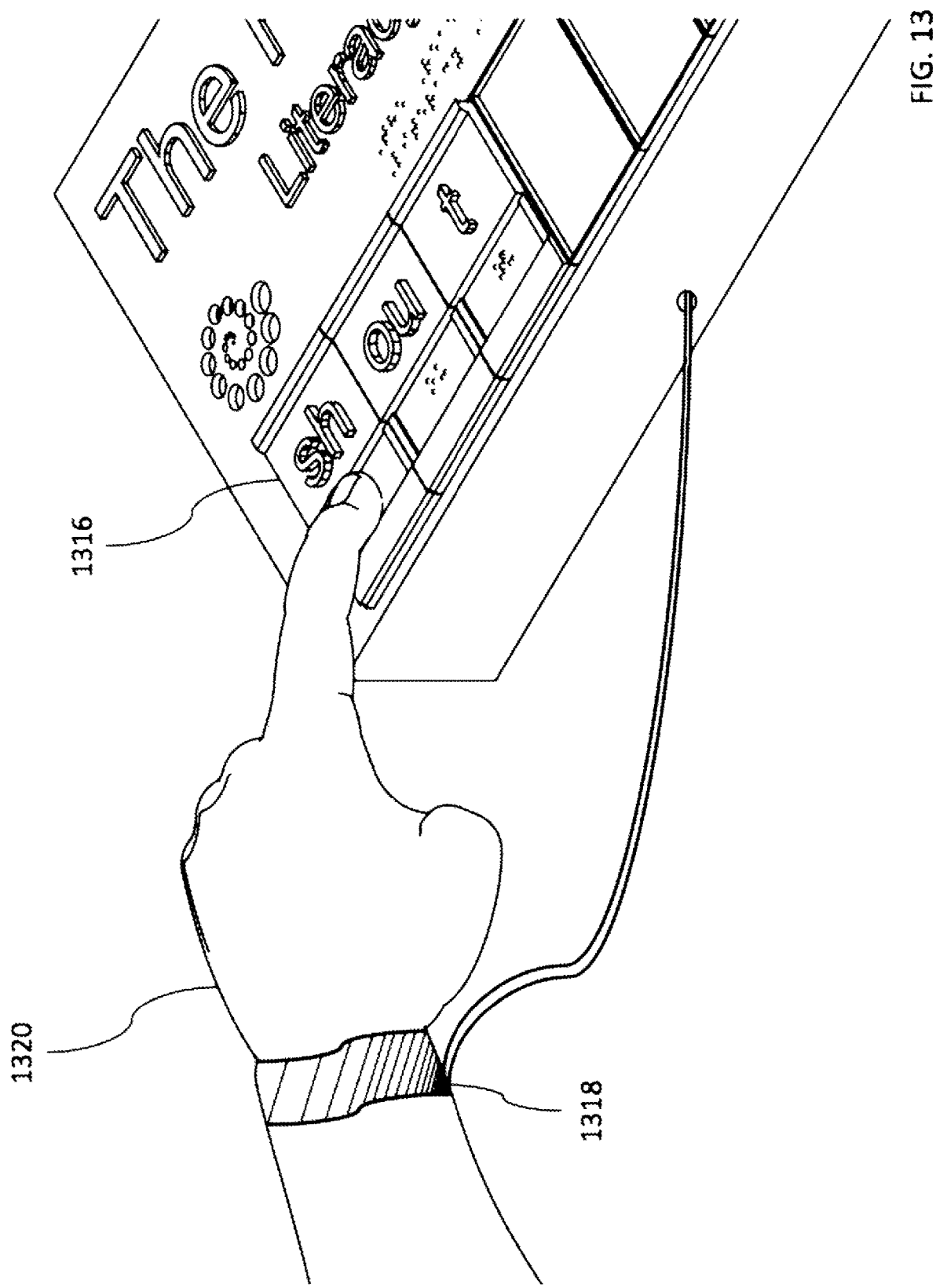
FIG. 13 is a schematic drawing of the second embodiment showing a user swiping/scrubbing across multiple tiles in succession.

The interchangeable tiles 815 (FIG. 8) may be demarcated with graphemes such as the letter "m" 1008 (FIG. 10) or the letters "ing" 1208 (FIG. 12) which may be arranged to form words 1316 (FIG. 13). A user may interact with the tiles 815 (FIG. 8), for example, by sliding a finger 1020 (FIG. 10) along a conductive surface 1004 (FIG. 10) of a tile 816 (FIG. 10), so that the corresponding visual 140 and/or auditory 130 articulations of the individual tile 815 (FIG. 8) and/or the word 1316 (FIG. 13), depending on the mode that the user selects, are elicited. The tiles 815 (FIG. 8) should at least include common graphemic representations of the forty-four possible English phonemes, and preferably should include the approximately two hundred fifty most common orthographies that correspond to those phonemes.

The tiles 815 (FIG. 8) may represent the phonemes, words, symbols, or concepts of any language, and may employ orthographies that are not typical of the common writing systems of the languages. The tiles 815 (FIG. 8) may also relate to non-linguistic concepts, for example, mathematical, musical, programmatic, and other concepts that may be distinctly represented by a manipulative. The tiles 815 (FIG. 8) may have shapes that a user can interact with, for example, a conductive triangle, when traced, may elicit the playing of an audio file 330 (FIG. 3) naming the shape in the present language, or textures, for example, a tile 815 (FIG. 8) may have a roughly textured surface, and as the user touches the surface, an audio file 330 (FIG. 3) of someone/something articulating the word 'rough' may be played.

The identification 110 of the tiles 815 (FIG. 8) may occur via the same modality as the measure of user interaction 120, for example, measures of capacitance and/or resistivity or measures of changes in capacitance and/or resistivity, or by other means, for example, the physical depression of pins 1710 (FIG. 17) by protrusions in tiles 2144 (FIG. 21), 2146 (FIG. 21) that complete circuits to identify the tiles 815 (FIG. 8), the completion of circuits by conductive contacts on tiles 903 (FIG. 9), or by other means, for example, by automatic identification and data capture (AIDC), for example, radio-frequency identification (RFID) 2410 (FIG. 24), bar code scanning, magnetic stripe readers, Optical character recognition (OCR) 2680 (FIG. 26), or integrated circuit card readers, or radio communication, for example, Bluetooth, and/or via visual data collected by a video and/or infrared camera 280 (FIG. 2), 2680 (FIG. 26). Interaction with certain tiles 815 (FIG. 8) and/or combinations of tiles 1316 (FIG. 13) elicits one or more events, depending on the mode that the user selects, such as the playing 330 (FIG. 3) or stopping 363 (FIG. 3) of an audio file 130, for example, the corresponding phoneme of the grapheme 1008 (FIG. 10), 1108 (FIG. 11), 1208 (FIG. 12) represented on a single tile 816 (FIG. 8), or the corresponding aural articulation of the word represented by a series of tiles 1316 (FIG. 13) placed on the input array 710 (FIG. 7), the playing 340 (FIG. 3) or stopping 363 (FIG. 3) of a video file 140, or the display 350 (FIG. 3) or retraction 363 (FIG. 3) of pins on a refreshable Braille display or other tactile output 150, for example, a refreshable tactile output display, or the execution of a command within a computer program controlled by the CPU 100 or the CPU 200 of an external device 260. The playing of video files 340 (FIG. 3) may be accomplished via an embedded screen, for example, an LCD 140, 1540 (FIG. 15), 2440 (FIG. 24) which may be movable to enhance viewing angles, or a tablet rest may be incorporated into the device to enable users to use existing tablets 260 or other mobile devices 260, or any device with a display, to display visual outputs of the device 240, by connecting as an external display 240 via a wireless connection, for example, Bluetooth, Wi-Fi, or by other means, or a hardwire connection, for example, HDMI, VGA, USB, Ethernet, or by other means.

The device 10 may use a static or refreshable Braille display with conductive pins that allow the device to sense which cell the user is touching, or a static or refreshable Braille display which senses user touch by alternate means, for example, by a sensor measuring physical force of depression, or proximity, or by other means.

The device 10 may play an amplified 132 audio file 130 of the phoneme or word, with adapted outputs 130 made for deaf and hard-of-hearing users, for example, a compact, low-frequency bass speaker that may be placed on the user's nasal area, or by the user's vocal cords, in order to demonstrate the complex articulation of speech sounds to users with impaired or non-existent hearing.

The control device 100 may be pre-programmed 270 and may be reprogrammed by the user 270, or another agent, locally via uploading audio recordings recorded by the microphone 290 or video recordings or still images recorded by the video/still camera 280 to the data storage device 270, to add items such as names and other proper nouns, in any language. The device 100 uses a simple user input, for example, touching a 'record' tile, flipping a switch, or pushing a button, to prompt the device 100 to record and store data, such as a user-created audio recording via a microphone 290, or a picture and/or video recording via a camera 280 and/or video camera 280, that is associated with a subsequent tile that the user touches or is proximal to. The user may also place a sequence of tiles 1316 (FIG. 13) on the array 810 (FIG. 8) that spell a proper noun, or other word, not already stored in the device's memory 270, and record an audio recording 290 or video recording 280, or import an audio recording 290 or a video recording 270 into the memory 270 of the device, so that future interactions with the sequence of tiles 1316 (FIG. 13) results in the device recognizing the word as being spelled correctly and/or eliciting the playing of the associated audio 130, image 140, video 150, or tactile output 150. The device 10 may also use text-to-speech software to algorithmically articulate a myriad of words without storing a discrete set of vocabulary.

The user, or another agent, may also upload remotely-created files to the data storage device 270, for example, by downloading from an external device 260 via hardwire connection, for example, Ethernet or USB, or wirelessly, for example, by Bluetooth or Wi-Fi or a cellular connection to the internet. The device 10 may be coupled with an external device 260, for example, a tablet or computer, so that hardware components such as a speaker 230, monitor 240, refreshable Braille display 250, microphone 292, data storage device 272, camera 282, cellular data connection, and/or other components need not be incorporated directly into the device 10, thereby reducing the production cost and/or price of the device 10.

The device 10 may also use tiles 815 (FIG. 8) that represent different programming commands, and these tiles 815 (FIG. 8) may be joined physically, or placed proximally, as a physical analog to the digital block construction of Scratch or other programming languages. Users may then run a program or command(s) by MTTI, having its output displayed on the display 140 or via other output devices, for example, LEDs, speakers 130, motors, or other digital/analog peripherals.

The device 10 may also use tiles 1816 (FIG. 18) that represent the notes 1808 (FIG. 18) and rests of traditional music notation. By placing the notes on a staff (stave) 1808 (FIG. 18), the user can touch a conductive portion/portions 1804 (FIG. 18) of the individual tiles, which may contain braille, in succession to play the melody that corresponds to the notes and rests on the tiles 1816 (FIG. 18), and or hear the corresponding solfege, and/or hear the corresponding letter names of the notes, and/or hear the corresponding braille dot numbers. Different instrument tiles 815 (FIG. 8) or other user inputs, for example, switching switches, pushing buttons, or turning dials, can signify the timbre (which instrument the notes are being played from).

Figure 3:
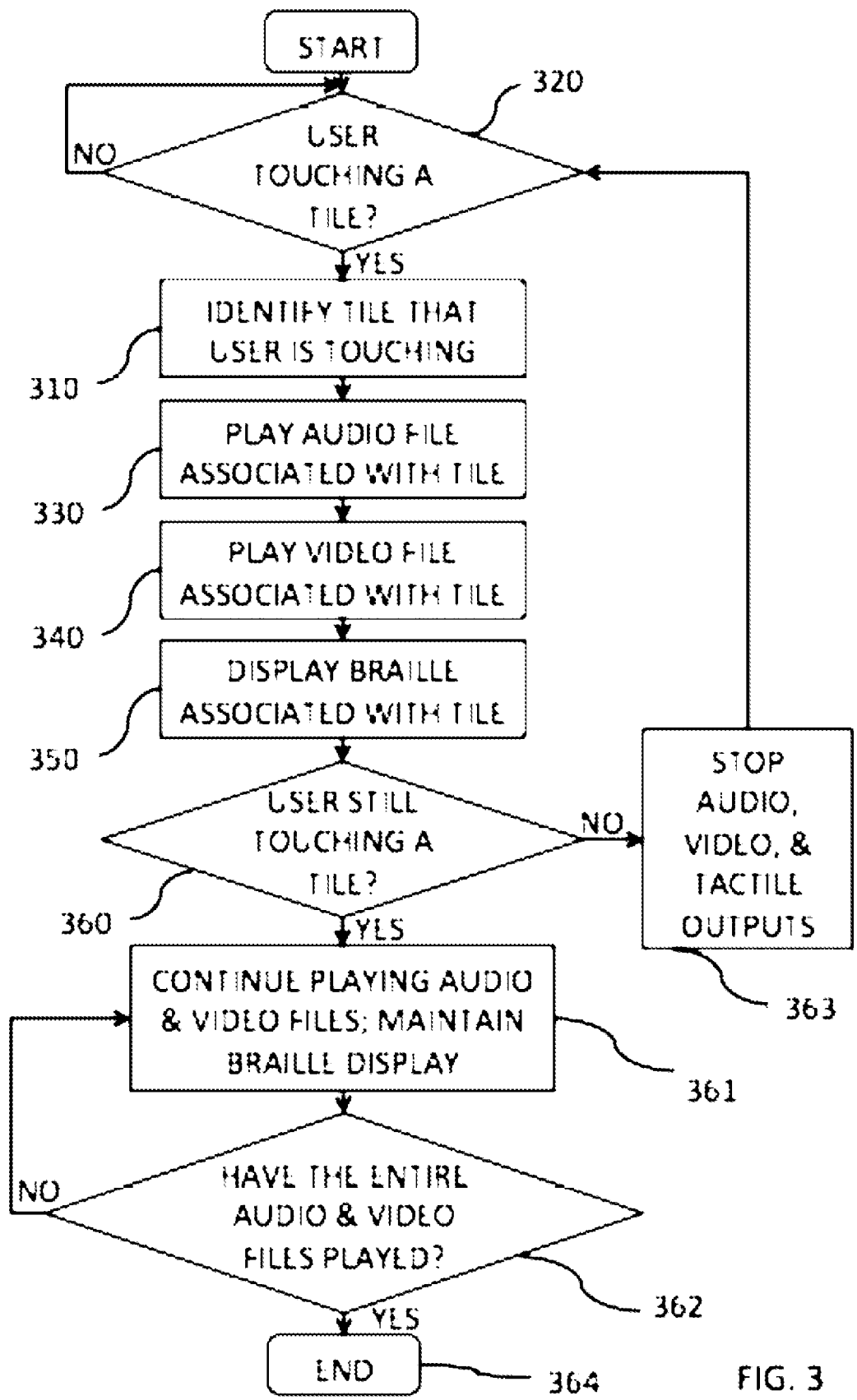
FIG. 3 is a flowchart of an exemplary method for operating the device of FIG. 1 in phoneme articulation mode.

FIG. 3 is a flowchart representing a first embodiment of a method for operating the first embodiment of the present device 10 (FIG. 1). It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The device 10 senses user touch and/or proximity by capacitive and/or resistive sensing, as shown by block 320, and determines the identity of the tile that the user is touching and/or proximal to, as shown by block 310, in order to output via an audio file, as shown by block 330, play a video file, as shown by block 340, display braille associated with a tile, as shown by block 350 or maintain the playing of an audio file, as shown by block 361, maintain the playing of a video file, as shown by block 361, and/or maintain a refreshable display of braille associated with a tile, as shown by block 361.

The identification of the tile 310, 110 (FIG. 1) may occur via the same modality as the measure of user interaction 120 (FIG. 1), for example, measures of or measures of changes in capacitance and/or resistivity, or by other means, for example, the physical depression of pins 1710 (FIG. 17) by protrusions in tiles 2144 (FIG. 21), 2146 (FIG. 21) that complete circuits to identify the tiles 815 (FIG. 8), the completion of circuits by conductive contacts on tiles, or by other means, for example, by automatic identification and data capture (AIDC), for example, radio-frequency identification (RFID) 710 (FIG. 7), bar code scanning, magnetic stripe readers, Optical character recognition (OCR), or integrated circuit card readers, or radio communication, for example, Bluetooth, and/or via visual data collected by a video and/or infrared camera 280 (FIG. 2). In this ideal first embodiment of the device 10 (FIG. 1), if the user selects the mode which plays audio files of the phonemes associated with the graphemes 1008 (FIG. 10), 1108 (FIG. 11), 1208 (FIG. 12) or Braille 1214 (FIG. 12) represented on tiles 815 (FIG. 8), an extended recording, for example, one that is approximately ten seconds in duration, of a held articulation of the phoneme may play 330, and/or the corresponding video file 340, 1529 (FIG. 15) associated with the visualization of the articulation of the phoneme corresponding to the grapheme 1008 (FIG. 10), 1108 (FIG. 11), 1208 (FIG. 12) on a tile 816 (FIG. 8) may play 330, 340, and/or a corresponding, computer-synthesized audio file may play, and/or the corresponding Braille or other tactile display 350 associated with the Braille or other representation of the letter or letters may play 350 and/or be displayed when the user touches the tile 320 and continue to play as long as the user continues to touch the tile 360, 361 and the entire audio and/or video file has not played 362, and/or the device may play audio corresponding to the corresponding braille dot numbers. If the user ceases touching the tile 360 then the device stops playing the associated audio 330 and video 340 file 363. If the entire audio 330 and/or video 340 file has played 362 then the procedure ends 364 and may resume upon the following user touch 320.

Figure 4:
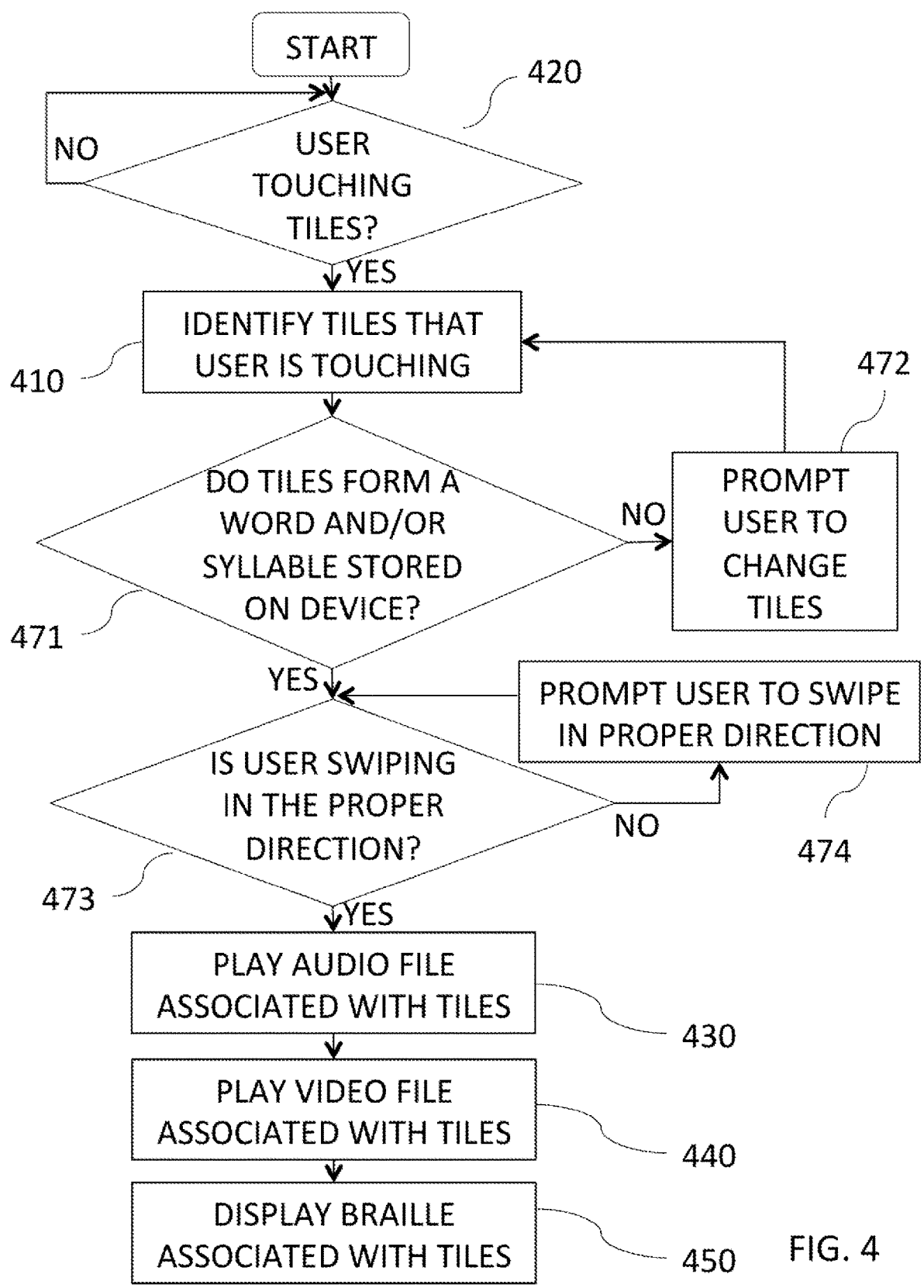
FIG. 4 is a flowchart of an exemplary method for operating the device of FIG. 1 in word/syllable articulation mode.

FIG. 4 is a flowchart representing a second embodiment of a method for operating the first embodiment of the device 10 the means by which an ideal first embodiment of the present device 10 (FIG. 1) functions if the user selects the mode which allows the user to construct words and syllables that the device 10 (FIG. 1) may articulate or otherwise represent. The device 10 (FIG. 1) senses user touch and/or proximity by capacitive and/or resistive sensing 420, and determines the identity of the tiles 815 (FIG. 8) that the user is touching 410 and determines whether the tile 816 (FIG. 8) or tiles 1316 (FIG. 13) that the user touches 410 form a word and/or syllable that are stored in the device's data storage device 471, 270 (FIG. 2), 272 (FIG. 2). If the device 10 (FIG. 1) determines that the tiles 1316 (FIG. 13) that the user touches 410 do not form a known word or syllable, then the device prompts the user to change the tiles 1316 (FIG. 13) or their arrangement 472, for example, by audible, visual, or tactile cues. If the device 10 (FIG. 1) determines that the tiles 1316 (FIG. 13) that the user is touching 410 do form a known word or syllable, then the device 10 (FIG. 1) determines whether the user is swiping in the proper direction 473, for example, from the leftmost tile to the rightmost tile, as per English conventions of text. If the device 10 (FIG. 1) determines that the user is not swiping in the proper direction 473, then the device may prompt the user to modify the trajectory of the swipe, for example, by audible, visual, or tactile cues, for example, by having LEDs light in sequence under the tiles to be touched, in the direction of the proper swipe trajectory, or by having on-screen visual cues 1529 (FIG. 15), or by having audible instructions, or by having refreshable tactile pins cue the proper trajectory, by serially presenting a pin under each tile in succession. If the device 10 (FIG. 1) determines that the tiles that the user is touching 410 do form a known word or syllable and that the user is swiping in the proper direction 473, then a recording of an articulation of the word or syllable may play 430, and/or the corresponding video file 340, 1529 (FIG. 15) associated with the visualization of the articulation of the word or syllable may play, and/or an image or video associated with the word and/or concept may be displayed 440, 1529 (FIG. 15), and/or the corresponding Braille or other tactile display 450 associated with the Braille or other representation of the syllable or word may play and/or be displayed, and/or the device may play audio corresponding to the corresponding braille dot numbers. Thus, if the user selects the mode which plays audio files associated with the articulation of the words formed by combinations of one or more tiles, then when the user swipes 1020 (FIG. 10), in the appropriate direction, across all of a series of tiles 420, 1316 (FIG. 13) placed on the array 710 (FIG. 7) the device 10 (FIG. 1) verifies that the word is valid using its internal data storage 270 (FIG. 2) and plays the stored audio file 430 associated with the articulation of the word formed by the letter(s) 1008 (FIG. 10), 1108 (FIG. 11), 1208 (FIG. 12) or combination of the letters 1316 (FIG. 13) on one or more tiles 1316 (FIG. 13), and/or a corresponding, computer-synthesized audio file, and/or the corresponding video file 440, 1529 (FIG. 15) associated with the visualization of the articulation of the word formed by the letter(s) 1008 (FIG. 10), 1108 (FIG. 11), 1208 (FIG. 12) or combination of the letters 1316 (FIG. 13) on one or more tiles 1316 (FIG. 13), and/or the corresponding Braille or other tactile display 450 associated with the Braille or other tactile representation of the word formed by the letter(s) 1008 (FIG. 10), 1108 (FIG. 11), 1208 (FIG. 12) or combination of the letters 1316 (FIG. 13) on one or more tiles 1316 (FIG. 13). Likewise, if the user swipes 1020 (FIG. 10), in the appropriate direction, across a subset of the tiles 420, 1316 (FIG. 13), the device 10 (FIG. 1) verifies that the word is valid using its internal data storage 270 (FIG. 2) and plays the stored audio file 430 associated with the articulation of the syllable or syllables formed by the combination of the letters 1316 (FIG. 13) on multiple tiles 1316 (FIG. 13) that the user has touched and/or the corresponding video file 440, 1529 (FIG. 15) associated with the visualization of the articulation of the word formed by the letter(s) 1008 (FIG. 10), 1108 (FIG. 11), 1208 (FIG. 12) or combination of the letters 1316 (FIG. 13) on one or more tiles 1316 (FIG. 13), and/or the corresponding Braille or other tactile display 450 associated with the Braille or other tactile representation of the word formed by the letter(s) 1008 (FIG. 10), 1108 (FIG. 11), 1208 (FIG. 12) or combination of the letters 1316 (FIG. 13) on one or more tiles 1316 (FIG. 13).

Figure 5:
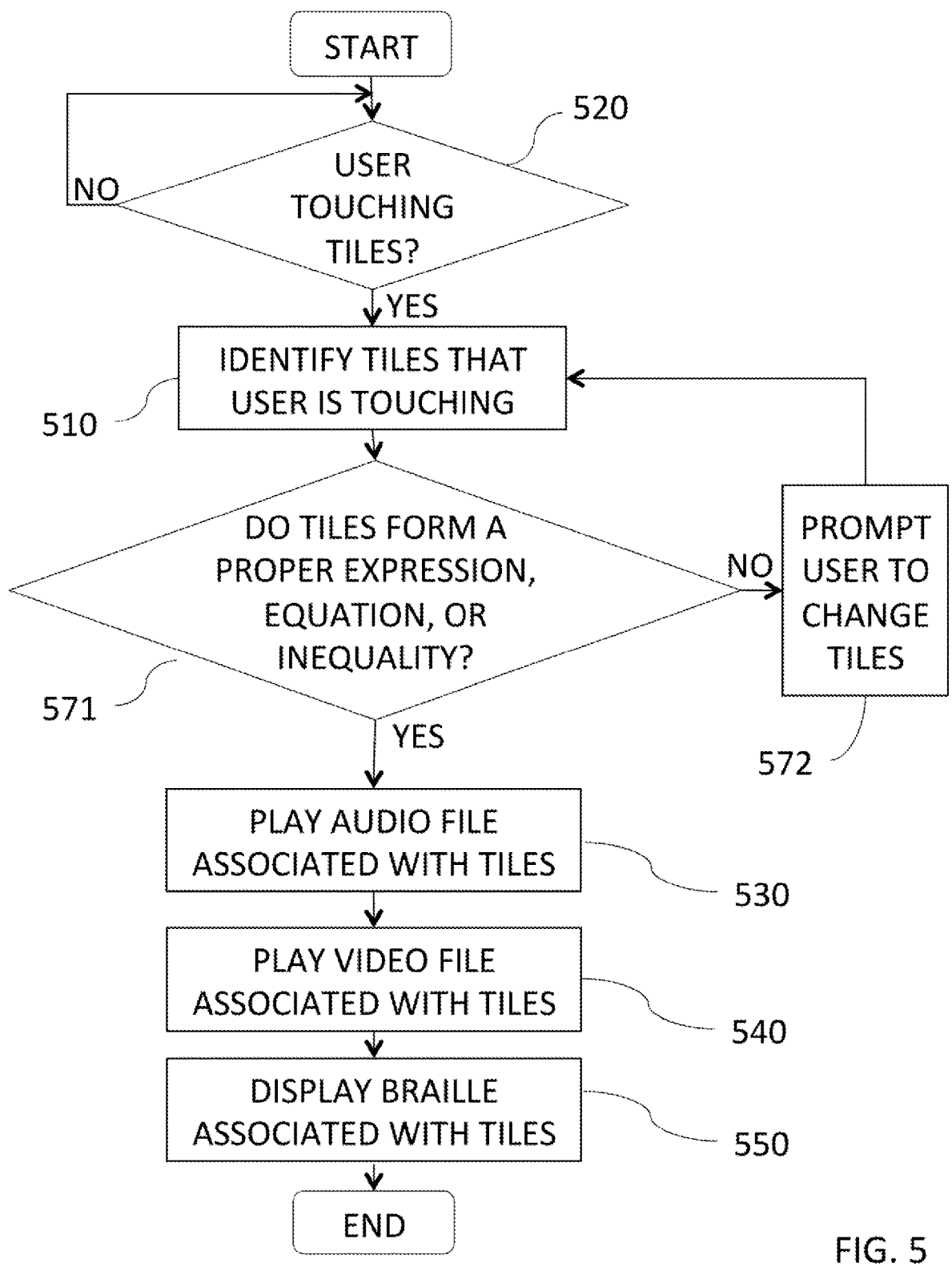
FIG. 5 is a flowchart of an exemplary method for operating the device of FIG. 1 in mathematics mode.
Figure 7:
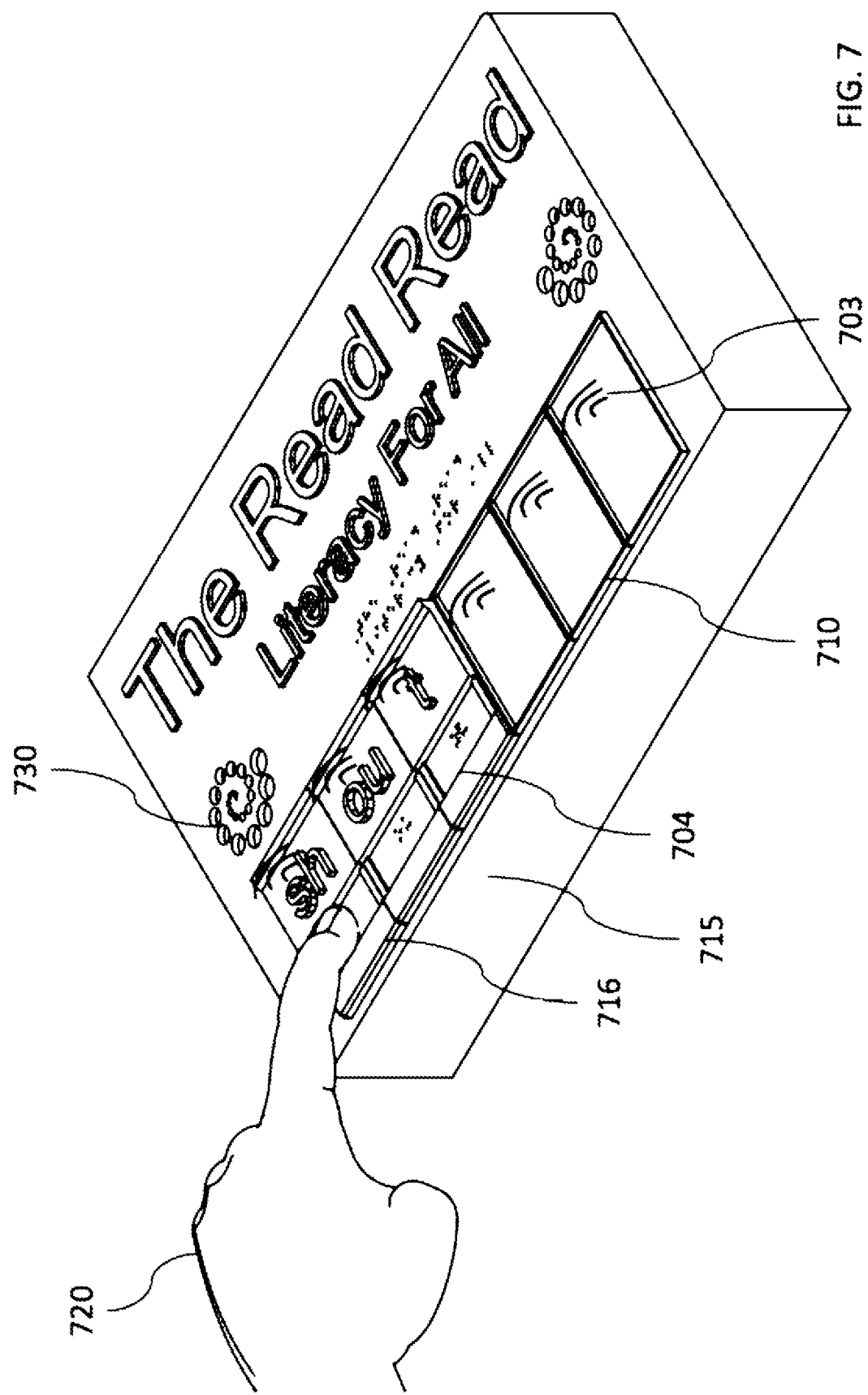
FIG. 7 is a schematic drawing of the first embodiment of the device of FIG. 1 viewed from above, showing a user touching tiles.

FIG. 5 is a flowchart representing a third embodiment of a method for operating the first embodiment of the device 10 (FIG. 1) if the user selects the mode which allows the user to construct mathematical equations and/or inequalities represented by common numerals, dots, symbols, pictures, or other means that the device 10 (FIG. 1) may verify and articulate or otherwise represent. The user places tiles 815 (FIG. 8) that represent mathematical ideas, for example, numbers, groups, mathematical operators, equalities, and inequalities, on the array 710 (FIG. 7). The user then touches the tiles 520 and the device identifies the tiles 815 (FIG. 8) that the user is touching 510, and/or the device may play audio corresponding to the corresponding braille dot numbers. If the tiles 815 (FIG. 8) do not form a proper expression 571, equation, or inequality, the device 10 (FIG. 1) prompts the user to change or rearrange tiles 572. If the tiles 815 (FIG. 8) form a proper expression 571, the device 10 (FIG. 1) may simplify the expression using its onboard calculator 100 (FIG. 2), 270 (FIG. 2) and represent the simplification of the mathematical expression by playing an audio file 530, by playing an associated video or image file 540, or by displaying a tactile output, for example, Braille 550. If the tiles 815 (FIG. 8) form a proper equation or inequality 571, as determined by the onboard calculator 100 (FIG. 2), 270 (FIG. 2), the device 10 (FIG. 1) may represent the verified, positive truth value of the mathematical equation or inequality by playing an audio file 530, by playing an associated video or image file 540, or by displaying a tactile output, for example, Braille 550, or a negative truth value for improperly formed equations and/or inequalities.

Figure 6:
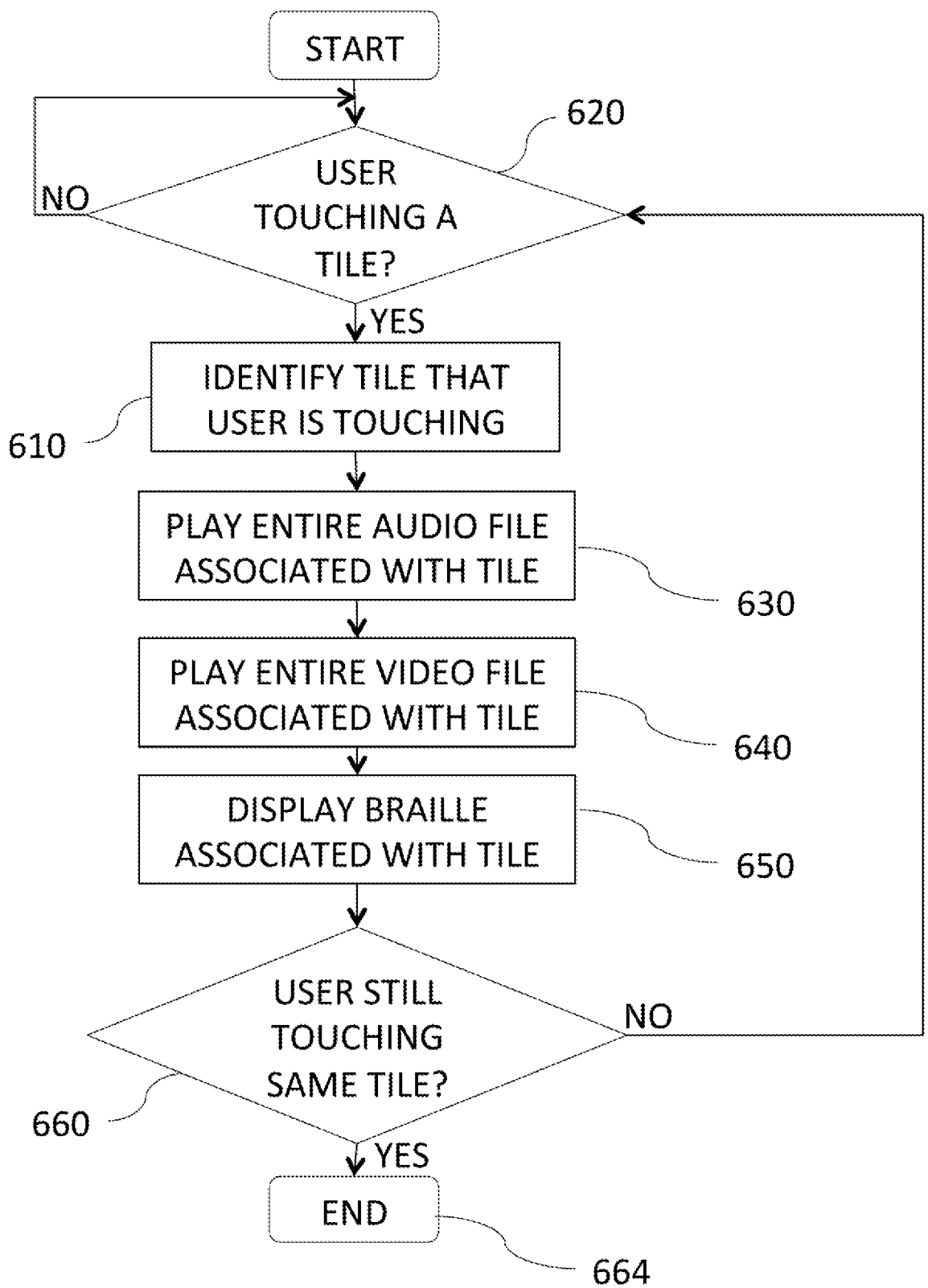
FIG. 6 is a flowchart of an exemplary method for operating the device of FIG. 1 in name/word/concept articulation mode.

FIG. 6 is a flowchart representing a fourth embodiment of a method for operating the first embodiment of the device 10 (FIG. 1) if the user selects the mode which plays audio files associated with letter names, object names, or concept names. The user places tiles 815 (FIG. 8) with graphemes 1008 (FIG. 10), 1108 (FIG. 11), 1208 (FIG. 12), Braille 1214 (FIG. 12), or other concepts, for example, object names, visual representations of objects or concepts, for example, a picture or image, or tactile representations of objects or concepts, on the array 710 (FIG. 7). When the user touches a tile 815 (FIG. 8), as measured by capacitive or resistive sensing 620, the device identifies the tiles 815 (FIG. 8) that the user is touching 610, and plays the entirety of an audio file associated with the tiles 815 (FIG. 8), for example, the articulation of the name of the grapheme 1008 (FIG. 10), 1108 (FIG. 11), 1208 (FIG. 12) or the articulation of the name of the letter corresponding to a particular Braille cell 1214 (FIG. 12), and/or the dot numbers represented by the Braille cell, or the articulation of the name of the image or concept represented by the tiles 815 (FIG. 8); and/or a corresponding, computer-synthesized audio file, and/or the corresponding video file 640, 1529 (FIG. 15), for example, a video of the visualization of the articulation of the name corresponding to the grapheme 1008 (FIG. 10), 1108 (FIG. 11), 1208 (FIG. 12) on a tile 816 (FIG. 8) may play; and/or the corresponding Braille or other tactile display 650 associated with the Braille or other representation of the letter, letters, name, or concept may play and/or be displayed. If the user ceases touching the tile 660, then the device may play the files associated with the same or a different tile upon the user's subsequent touch 620. If the user does not remove his/her finger from the tile 660, then the associated files may not play more than once 664.

FIG. 7 is a schematic drawing of a prototype of a first embodiment of the present phonics teaching device 10 (FIG. 1), when viewed from above. In this embodiment of the present invention, a set of tiles 715 with graphemes 1008 (FIG. 10), 1108 (FIG. 11), 1208 (FIG. 12) and corresponding Braille 1214 (FIG. 12) are placed by a user onto a series of magnetic, conductive inputs 710, and by touching a conductive strip, for example, one made from metal or a conductive polymer, 704, 1004 (FIG. 10) on each tile 716 (FIG. 7), 816 (FIG. 8) in a natural, fluid, left-to-right motion (or whichever motion is conventional for the present language) 473 (FIG. 4), akin to touching under words while reading or touching under graphemes while sounding out a word, the device plays audio 430 (FIG. 4) and/or video 440 (FIG. 4) files corresponding to the oral and/or physical articulation 1529 (FIG. 15) of the corresponding phonemes, thereby representing the aural 430 (FIG. 4), visual 440 (FIG. 4), and/or physical 1529 (FIG. 15) articulation of the phonemes or the words corresponding to the graphemes/symbols 1008 (FIG. 10), 1108 (FIG. 11), 1208 (FIG. 12) depicted on the tiles 715. The set of graphemes 1008 (FIG. 10), 1108 (FIG. 11), 1208 (FIG. 12) depicted on the tiles 715 is a sample subset of the graphemes needed to represent the forty-four possible English phonemes, and the approximately 250 most common orthographies that correspond to those phonemes. These tiles 715 are not limited to English phonemes, or phonemes at all, and may be used to represent any concept for which a set of physical objects may provide distinct representation, for example, pictures, images, shapes, texture, graphemes, symbols, syllables, Braille, contracted Braille, music notation, computer coding symbols, written words, or other concepts. In accordance with this first embodiment of the device 10 (FIG. 1), a set of tiles 715 which each has a unique grapheme 1008 (FIG. 10), 1108 (FIG. 11), 1208 (FIG. 12) picture, image, shape, texture, symbols syllable, Braille, contracted Braille, music notation, computer coding symbol, written word, or other concept, also has an RFID tag located in or on the tile. The antennas of one or more multiplexed RFID readers, or of multiple RFID readers are located below each of the magnetic, conductive inputs 710 such that when a tile 716 is placed on the magnetic, conductive input 710, the RFID tag is within the readable range 703 of the antenna 1666 (FIG. 16) of the RFID reader upon which the tile 716 has been placed, yet not within readable range 703 of the antenna 1666 (FIG. 16) of other RFID readers on the device 10 (FIG. 1), the device 10 (FIG. 1) is able to read the UID of the RFID tag 1665 (FIG. 16), and/or data stored on the RFID tag 1665 (FIG. 16), and thus identify the tile 716. In FIG. 7, the readable range 703 is signified by three arced lines, however, in different embodiments the functional area of the readable range 703 may be larger or smaller than depicted in FIG. 7.

This first embodiment is exemplary because the production of the tiles it uses may be fully automated, resulting in low production costs, and RFID antennas incorporated into a single PCB allow for a simple assembly of the device housing, and eliminates mechanically moving parts from the tile reading functionality of the device, thereby minimizing the chance of mechanical failure. Additionally, with the use of water resistant speakers, this embodiment is easily made water resistant, thus mitigating the threat of water damage causing the device 10 (FIG. 1) to be inoperable due to accidental spilling or high ambient humidity. The drawbacks of this embodiment are that RFID is susceptible to interference, for example, from other devices utilizing RFID or other forms of automatic identification and data capture (AIDC), as well as interference from water that exists between the RFID reader antenna and the RFID tag. Additionally, the need to place an RFID to in or on each tile increases the incremental cost of the tiles.

Figure 8:
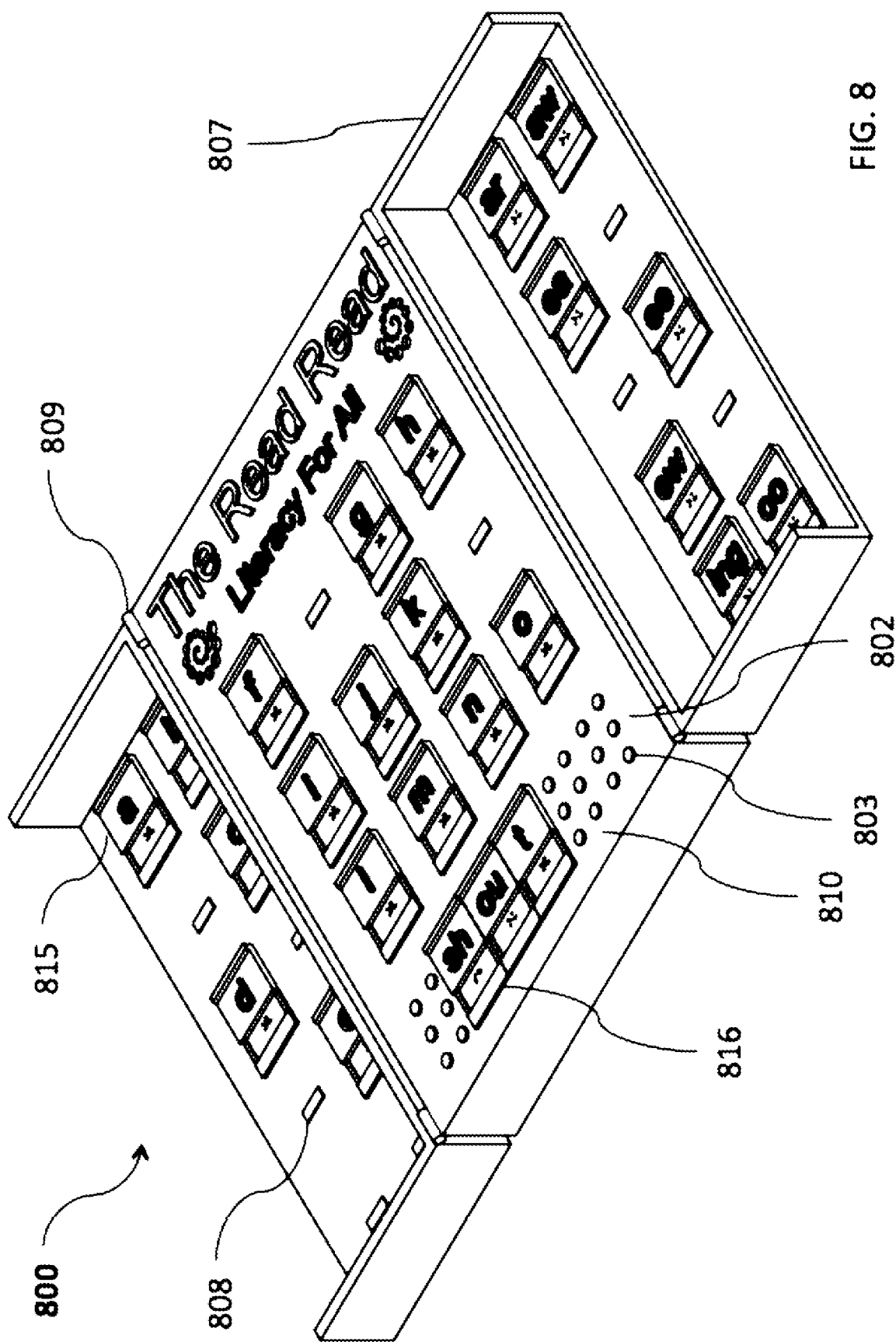
FIG. 8 is a schematic drawing of a second embodiment of a phonics teaching device, when open and viewed from above.
Figure 14:
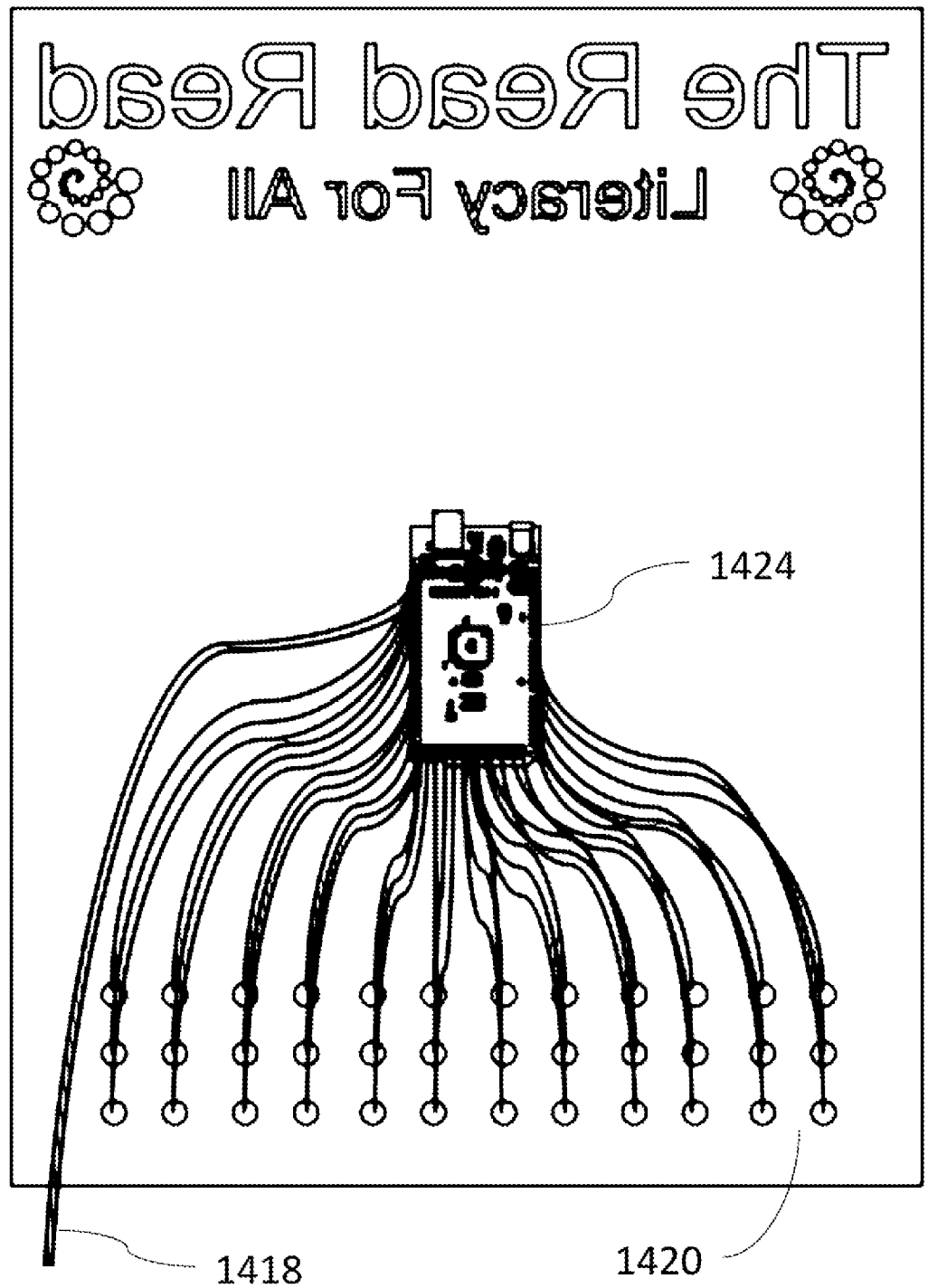
FIG. 14 is a schematic drawing of the exposed interior of the second embodiment showing some of its electrical components.

FIG. 8 is a schematic drawing of a prototype of a second embodiment of the present phonics teaching device 800, when open and viewed from above. In this embodiment of the present invention, a set of tiles 815 with graphemes 1008 (FIG. 10), 1108 (FIG. 11), 1208 (FIG. 12) and corresponding Braille 1214 (FIG. 12) are placed by a user onto a series of magnetic, conductive inputs 810, and by touching a conductive strip, for example, one made from metal or a conductive polymer, 1004 (FIG. 10) on each tile 816 in a natural, fluid, left-to-right motion (or whichever motion is conventional for the present language) 473 (FIG. 4), akin to touching under words while reading or touching under graphemes while sounding out a word, the device plays audio 430 (FIG. 4) and/or video 440 (FIG. 4) files corresponding to the oral and/or physical articulation 1529 (FIG. 15) of the corresponding phonemes, thereby representing the aural 430 (FIG. 4), visual 440 (FIG. 4), and/or physical 1529 (FIG. 15) articulation of the phonemes or the words corresponding to the graphemes/symbols 1008 (FIG. 10), 1108 (FIG. 11), 1208 (FIG. 12) depicted on the tiles 815. The set of graphemes 1008 (FIG. 10), 1108 (FIG. 11), 1208 (FIG. 12) depicted on the tiles 815 is a sample subset of the graphemes needed to represent the forty-four possible English phonemes, and the approximately 250 most common orthographies that correspond to those phonemes. These tiles 815 are not limited to English phonemes, or phonemes at all, and may be used to represent any concept for which a set of physical objects may provide distinct representation, for example, pictures, images, shapes, texture, graphemes, symbols, syllables, Braille, contracted Braille, music notation, computer coding symbols, written words, or other concepts. In accordance with this second embodiment of the device 800, a set of tiles 815 which each have a unique pattern of between one and six (or any number) holes cut out of them 905 (FIG. 9), 906 (FIG. 9) may be created. Each tile 816 may have a printed/embossed representation of a speech sound (grapheme) 1008 (FIG. 10), 1108 (FIG. 11), 1208 (FIG. 12) on it. A tile 816 may be placed onto a grid 802 that may include, for example, six input pins 802 (six input pins allow for 64 combinations of inputs, which accommodates the forty-four English phonemes: more pins are needed for greater numbers of output options), which align with the holes 904 (FIG. 9) on the tiles. Each tile 816 when placed on the grid 802, contacts a unique combination 905 (FIG. 9), 906 (FIG. 9) of pins 803. Each pin 803 may be wired to a device capable of measuring changes in electrical resistivity 1424 (FIG. 14). The user is part of a circuit, being attached (grounded) via a conductive material such as a wire 1318 (FIG. 13), 1418 (FIG. 14). Upon touching 1004 (FIG. 10) the tile 816 on the grid 802, the resistance measuring device 1424 (FIG. 14) detects the resistance flowing through the now completed circuit. In this embodiment, a current flows to the resistance measuring device 1424 (FIG. 14), and signals which input pins 803 are receiving current. A processor 2458 (FIG. 24) is able to identify which tile the user is touching, and then signals the playing of an audio file of the phoneme (sound) associated with the grapheme 1008 (FIG. 10), 1108 (FIG. 11), 1208 (FIG. 12). The device can also play a video 340 (FIG. 3) file associated with the articulation of the phoneme (a video or animation of a person articulating the phoneme). By arranging several grids 802 side-by-side (or in an orientation appropriate to the present language/topic) 810, a user may swipe 1020 (FIG. 10) across a series of tiles 1316 (FIG. 13) in a continuous, fluid motion such that the device plays the audio files, and or corresponding computer-synthesized audio in immediate succession, and articulates constructed phonetic words.

Figure 9:
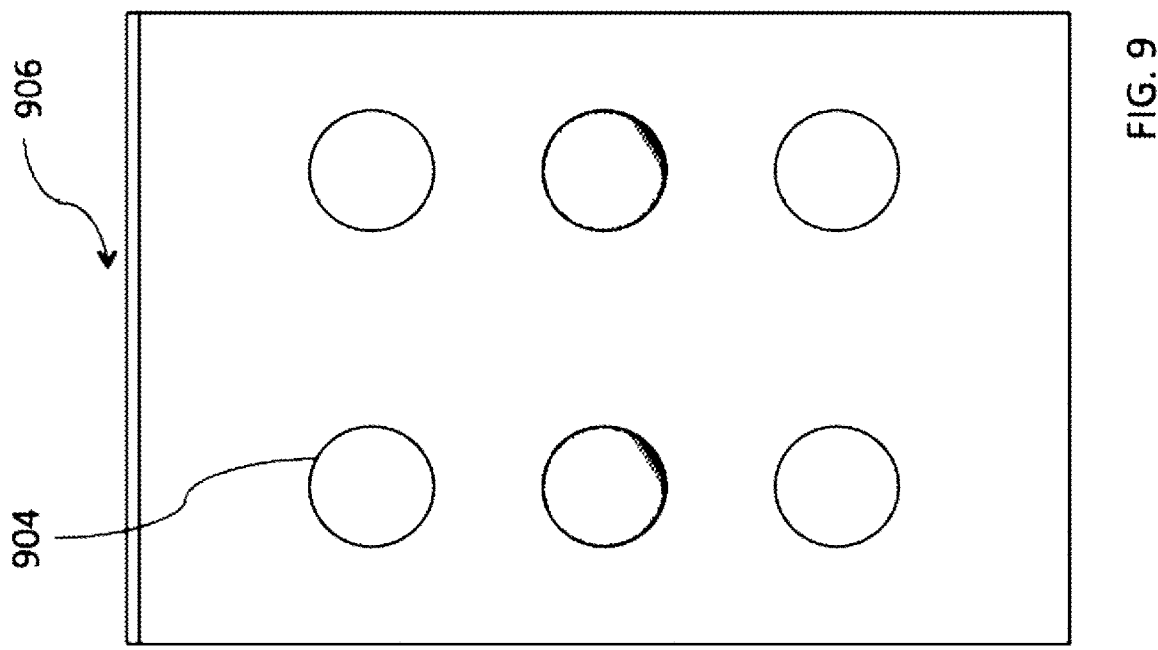
FIG. 9 is a schematic drawing of the second embodiment showing the reverse of two tiles with two different patterns of conductive contacts.
Figure 9:
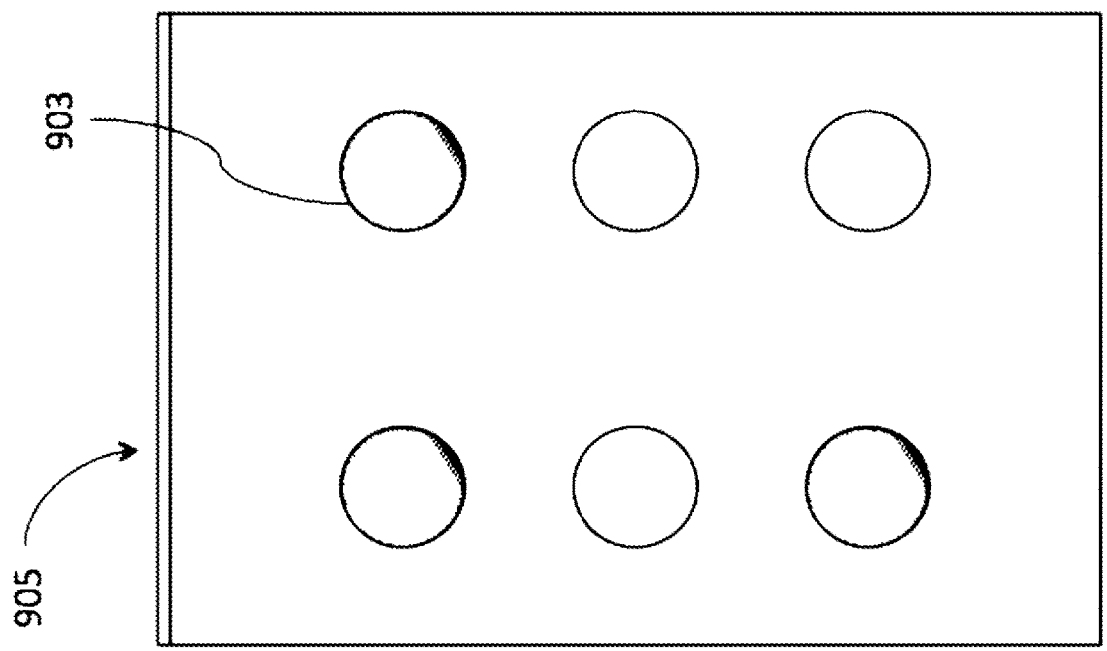
Figure 10:
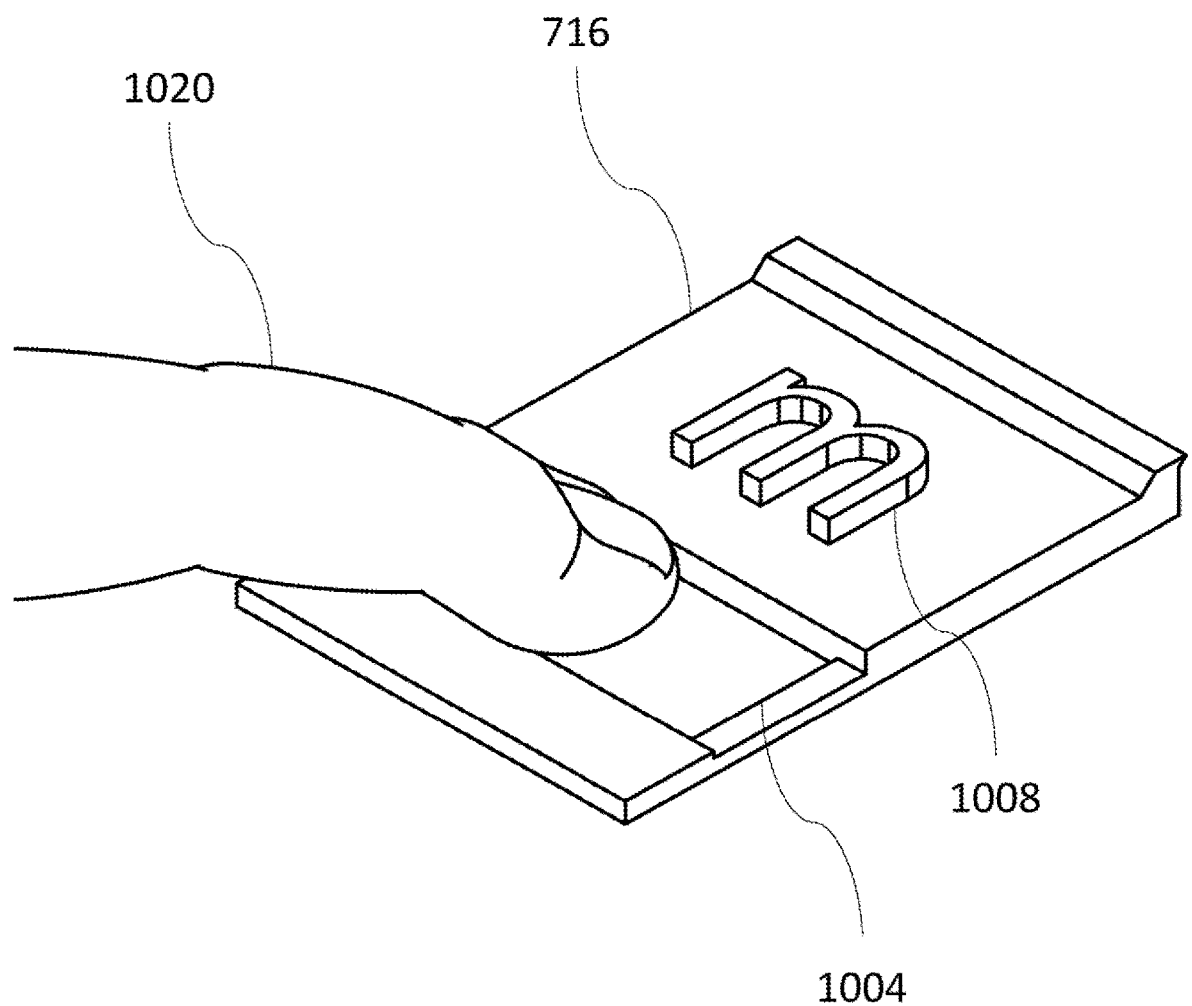
FIG. 10 is a schematic drawing of the second embodiment showing a user touching the conductive strip of a tile.

Operation of the embodiment of the device described above benefits from precise, instantaneous, real-time inputs to the device in order to identify the tile 815: this may be difficult to accomplish consistently, as it operates most efficiently when each tile 905 (FIG. 9), 906 (FIG. 9) and set of input pins 802 lie in a perfect plane, with precise contacts, while the user is swiping the tile 1020 (FIG. 10). Warping or damage caused to components (tiles 815 and/or input pins 802) or corrosion, oil buildup, soiling, etc. may be detrimental to the operation of this embodiment.

Various alternative embodiments may improve the operability of the basic embodiments. Magnetic holders 808, for example, those utilizing Neodymium or other rare Earth magnets, allow the tiles 815 to be secured, organized, and removed without the use of more complicated methods of adherence that may create unnecessary barriers of use, such as Velcro for users with limited motor coordination or muscle tone. Magnetic input pins 803 allow tiles to be held firmly in place while users swipe 1020 (FIG. 10). Hinges 809 allow the tile storing periphery 807 of the device 800 to be folded 800 (FIG. 8) when not in use, to minimize the footprint of the device 800 for storage.

FIG. 9 is a schematic drawing of the reverse of two tiles 815 (FIG. 8), 816 (FIG. 8) from the second embodiment 800 (FIG. 8) with two different patterns of conductive contacts 905, 906 which signify different combinations of inputs via measures of conductivity, and/or capacitance, and/or resistivity. In this second embodiment 800 (FIG. 8), patterns of metal contacts are made by punching holes 904 out of sheets of conductive metal 903 that are the center layers of the tiles 815 (FIG. 8), 816 (FIG. 8) allow the device 800 (FIG. 8) to identify the tiles 310 (FIG. 3), 410 (FIG. 4), 510 (FIG. 5), 610 (FIG. 6).

FIG. 10 is a schematic drawing showing a user 1020 touching the conductive strip 1004 of a tile 816. An embossed, large-print grapheme 1008 is prominent on the tile to be evident to typically sighted users, low-vision users, and tactilely differentiable to Blind users.

Figure 11:
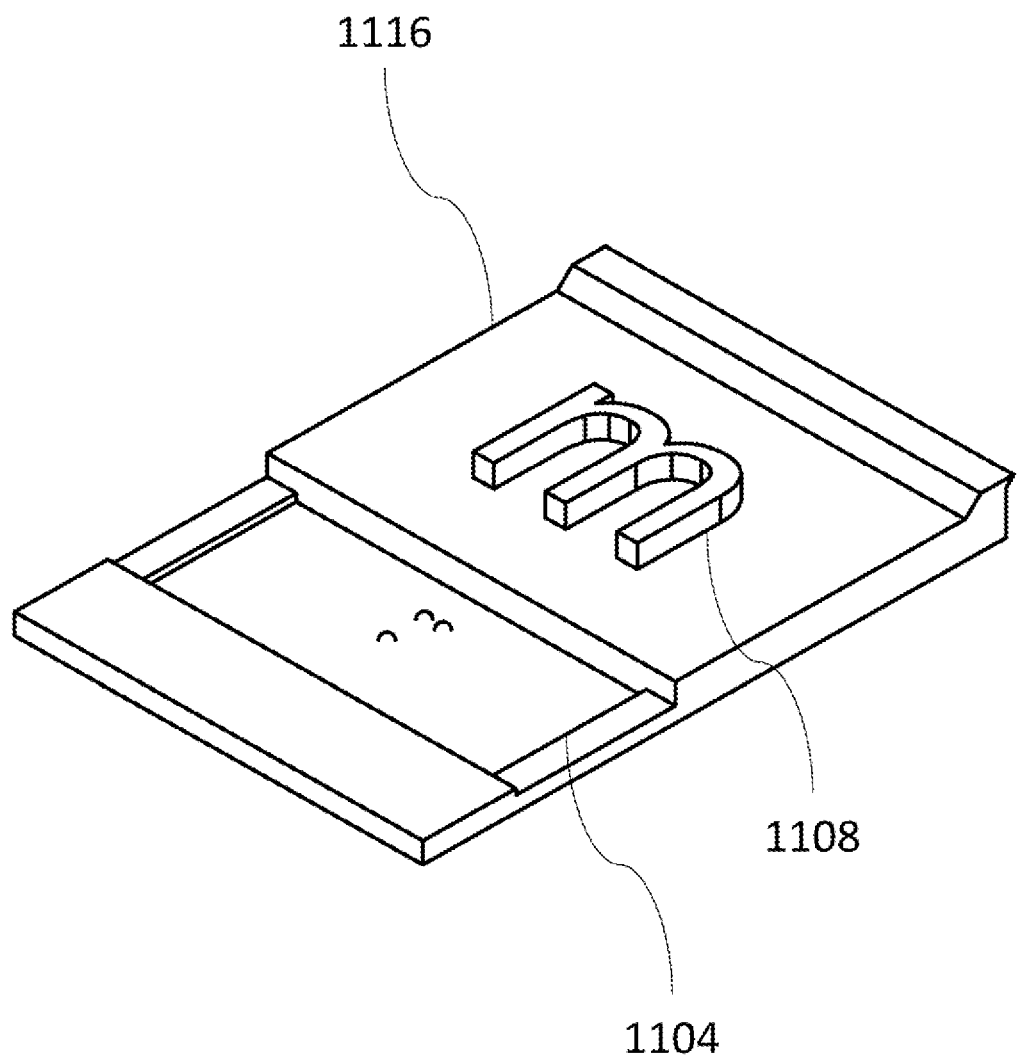
FIG. 11 is a schematic drawing of the second embodiment showing a tile labeled with the grapheme 'm'.

FIG. 11 is a schematic drawing of a tile 1116 showing the conductive strip 1104. An embossed, large-print, conductive grapheme 1108 is prominent on the tile to be evident to typically sighted users, low-vision users, and tactilely differentiable to Blind users. Tiles 815 (FIG. 8) may have slots that allow for the insertion of a printed photograph or image. By selecting a recording mode, the user may record 290 (FIG. 2), 280 (FIG. 2) or upload 270 (FIG. 2) an audio or video description and associate it with the tile 100 (FIG. 2). The device 10 (FIG. 1) may be used to prompt verbal articulation of the names of common or important objects for children acquiring language for the first time or people acquiring a non-primary language. By having tiles 815 (FIG. 8) with printed pictures on them, or tiles 815 (FIG. 8) that have an area into/on which printed, digital, or tactile pictures may be placed, for example, within a transparent slot or by surface mounting, users are able to hear the name of an object or person, for example, the name of a distant relative, each time they interact with the tile 816 (FIG. 8), and thus form the name-object relationship at an accelerated rate. Likewise a user studying a non-primary language may use MTTI to practice vocabulary words using physical objects 815 (FIG. 8).

FIG. 12 is a schematic drawing of a tile 1216 labeled with the grapheme 'ing' 1208, which, when placed on a set of input pins 802 (FIG. 8) and touched 1020 (FIG. 10), plays the audio 330 (FIG. 3) and video 340 (FIG. 3) files associated with the tile 1216. The image also shows the contracted Braille representation of the grapheme 'ing' 1214 which is represented as raised dots that have been embossed or molded into the conductive strip, for example, one made from metal or a conductive polymer, 1204.

FIG. 13 is a schematic drawing of a user swiping/scrubbing 1320 across multiple tiles 1316 in succession. The user is grounded to the device in this embodiment via a conductive bracelet and wire 1318, 1418 (FIG. 14) that is attached to ground on the circuit board 1424 (FIG. 14) of the device.

FIG. 14 is a schematic drawing of an embodiment of the device that utilizes circuit boards that measure changes in resistivity 1424 measured by connections to the input pins 1420, 803 (FIG. 8) by a current that travels from a ground wire 1418 to the user via the conductive strip 1004 (FIG. 10) on the tile 816 (FIG. 8), or that measure resistivity, capacitance, or changes in capacitance. The change in resistivity and/or capacitance then signals to a CPU 2458 (FIG. 24) a corresponding input which a program on the CPU (FIG. 24) interprets as a value (power of ten) which is added to the inputs from the other pins 803 (FIG. 8) in the grid 802 (FIG. 8) and summed to create a unique number, which corresponds to a particular audio 330 (FIG. 3), video 340 (FIG. 3), and/or tactile 350 (FIG. 3) file. Thus, when a user places a tile 816 (FIG. 8) on a grid 802 (FIG. 8) and (while grounded 1318 (FIG. 13) in the case of resistivity) touches the conductive strip 1204 (FIG. 12) on the tile 1216 (FIG. 12), the device 800 (FIG. 8) plays an audio file 330 (FIG. 3) of the phoneme which corresponds to the grapheme that is embossed on the tile 816 (FIG. 8) in large text 1008 (FIG. 10), 1108 (FIG. 11), 1208 (FIG. 12) and Braille 1214 (FIG. 12), and plays a video file 340 (FIG. 3), for example, one that corresponds to the visualization 1529 (FIG. 15) of the articulation of the phoneme (by showing a person/animation articulating the phoneme) 1529 (FIG. 15).

Figure 15:
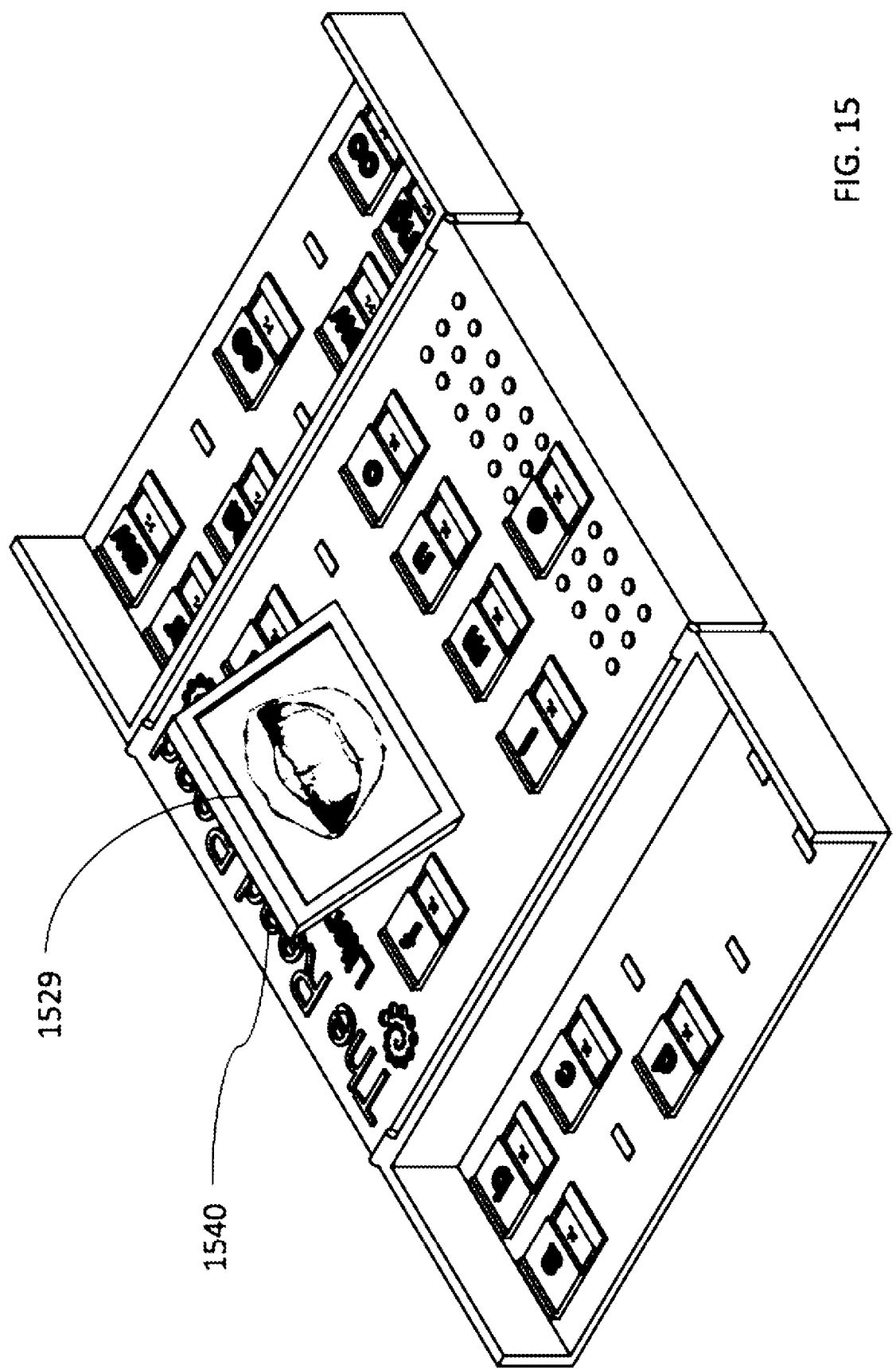
FIG. 15 is a schematic drawing of the second embodiment showing a monitor.

FIG. 15 is a schematic drawing of a monitor 1540 displaying an embodiment of a visualization that would correspond to the articulation of the phoneme /l/.

Figure 16:
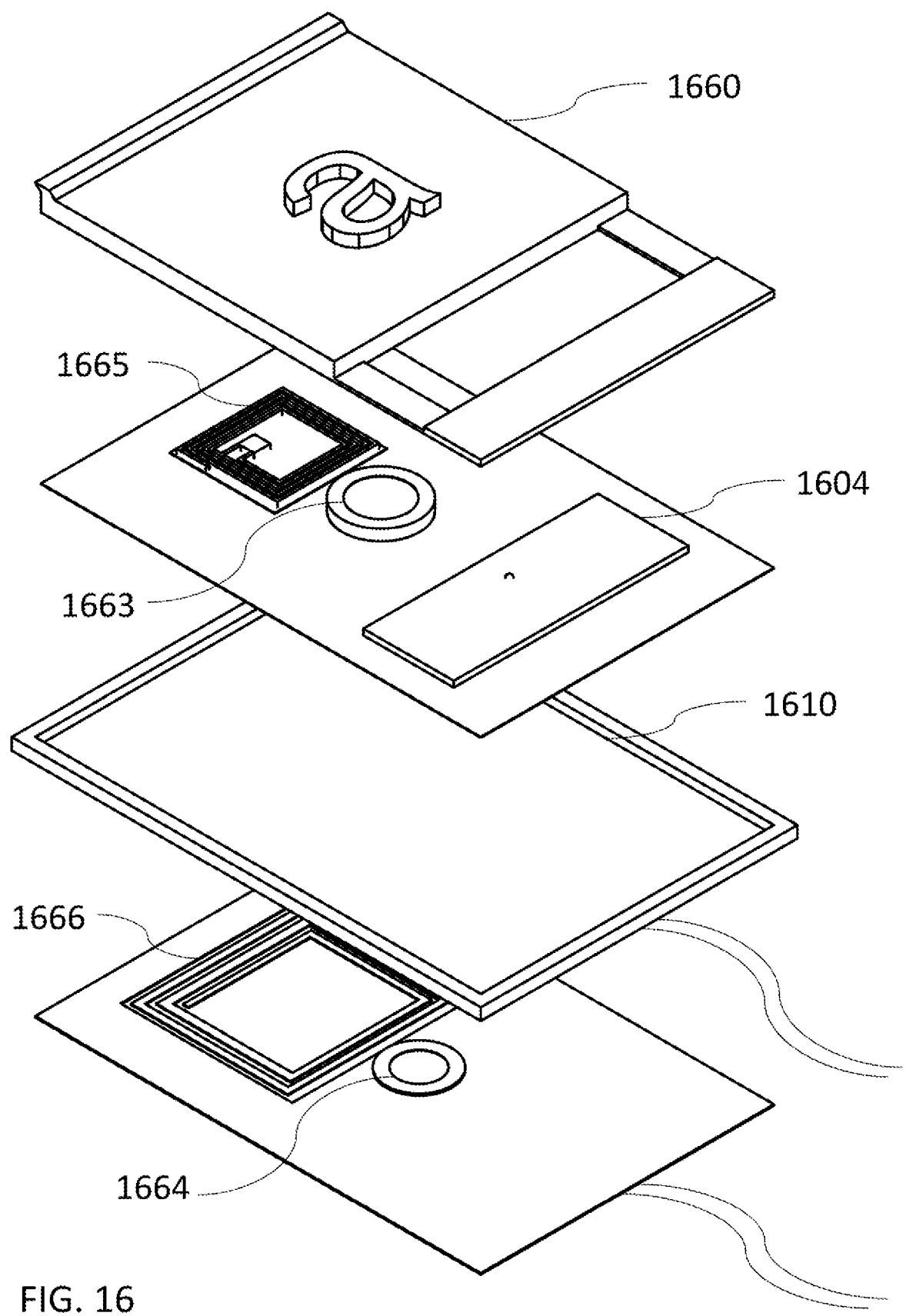
FIG. 16 is an exploded schematic drawing of two components of the first embodiment showing the functional mechanisms of the RFID tile identification and the capacitive touch detection.
Figure 24:
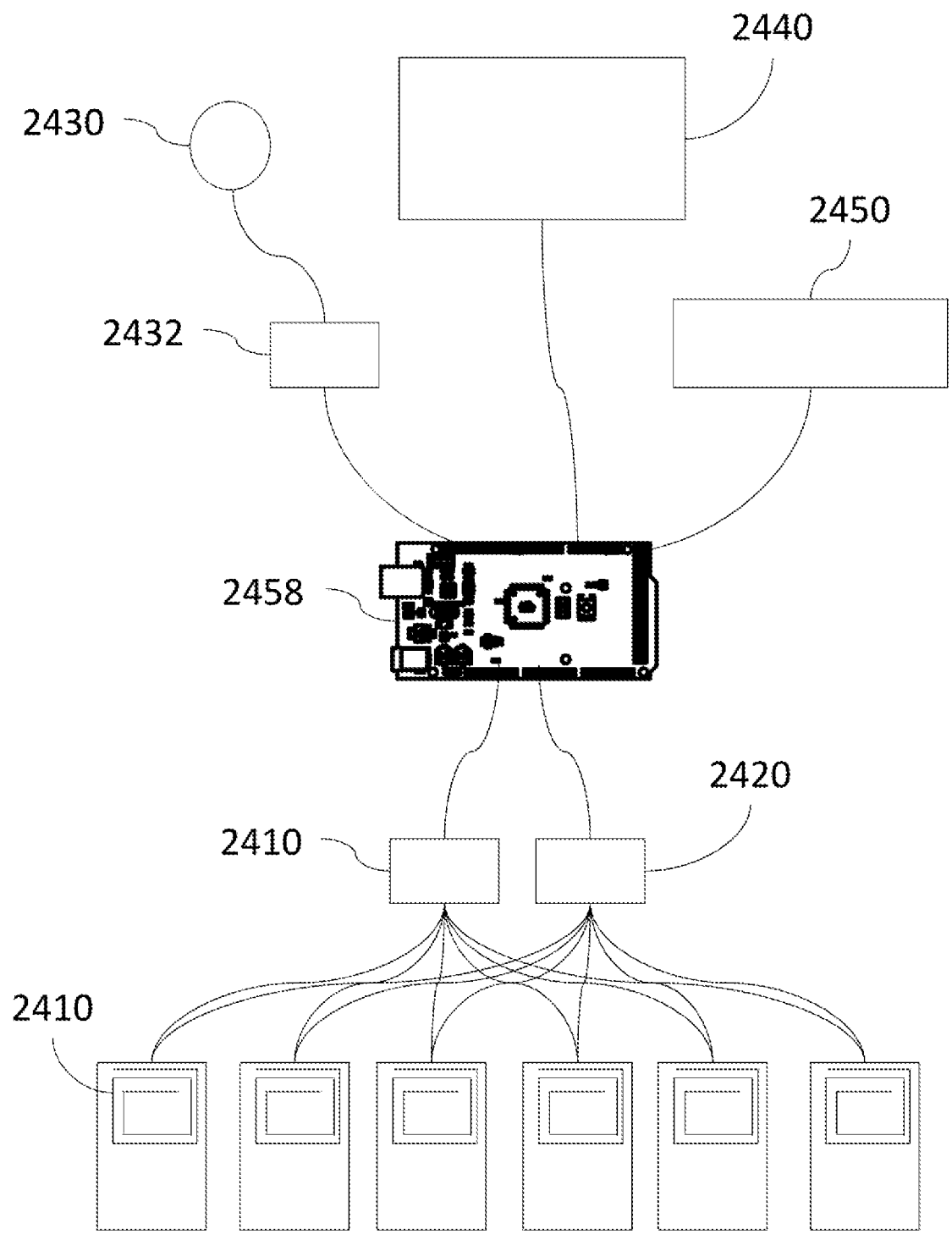
FIG. 24 is a schematic drawing of the first embodiment showing a capacitive touch sensor sensing user touch, and an RFID reader identifying tiles, both of which are connected to a microcontroller, which has outputs to a display, an amplifier which outputs to a speaker, and a refreshable braille display.

FIG. 16 is an exploded schematic drawing of two components of the first embodiment showing the functional mechanisms of the RFID tile identification via an RFID tag 1665 and RFID reader 1666, and the capacitive touch detection of the user's touch 1020 (FIG. 10) of the conductive portion 1604 of a tile 716 (FIG. 7) via the electrical contact of the conductive portion 1604 of the tile 716 (FIG. 7) with the conductive portion 1610 of the tile slot 710 (FIG. 7) which in turn is connected to the capacitive touch sensor 2454 (FIG. 24). This electrical contact may be aided by the mechanical contact created by the attraction of at least one magnet 1663 within the tile 716 (FIG. 7) and at least one magnet 1664 located beneath the conductive portion 1610 of the tile slot 710 (FIG. 7).

Figure 17:
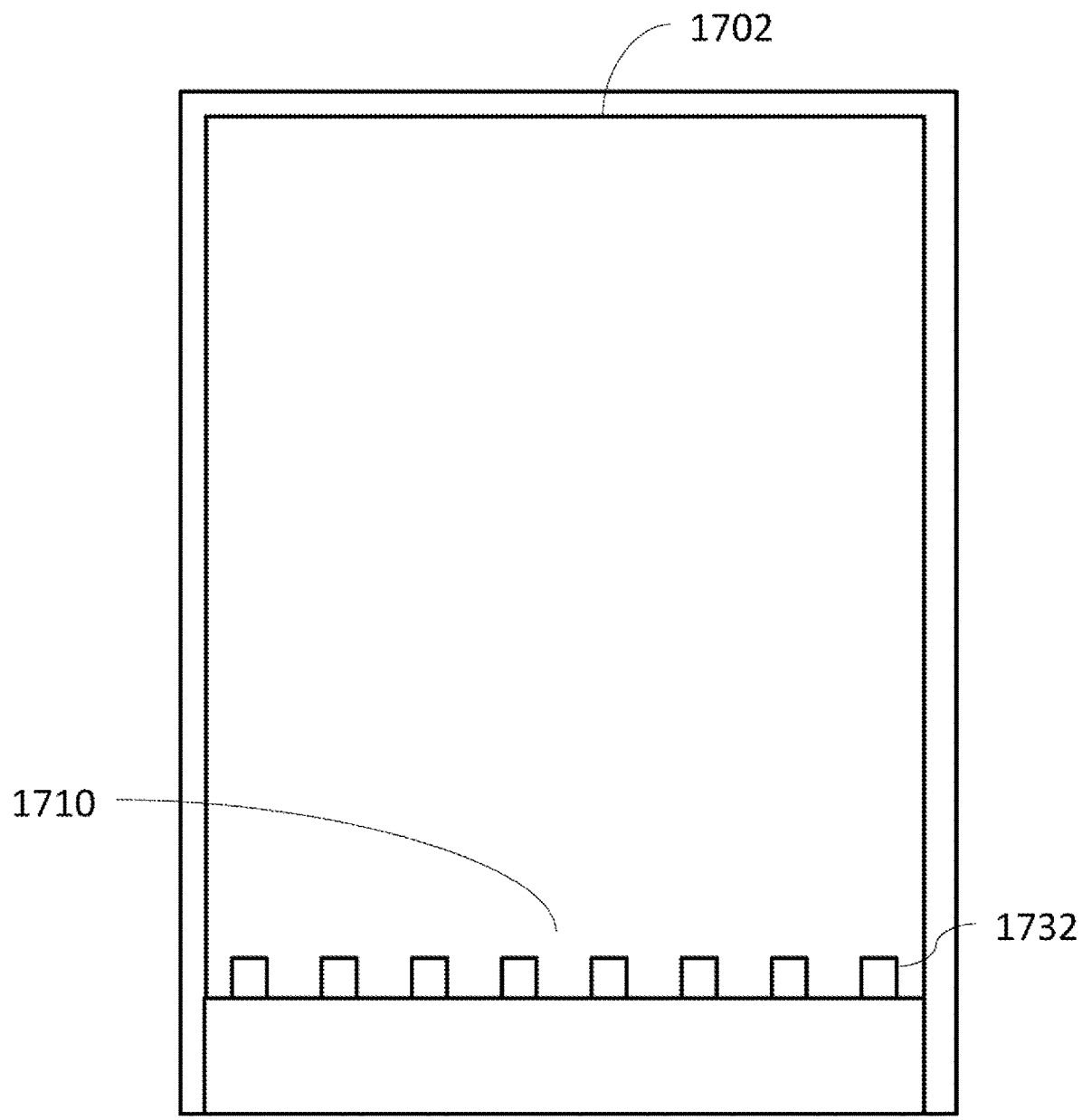
FIG. 17 is a schematic drawing of a third embodiment showing a physical input array that measures which tile is placed upon the array.
Figure 21:
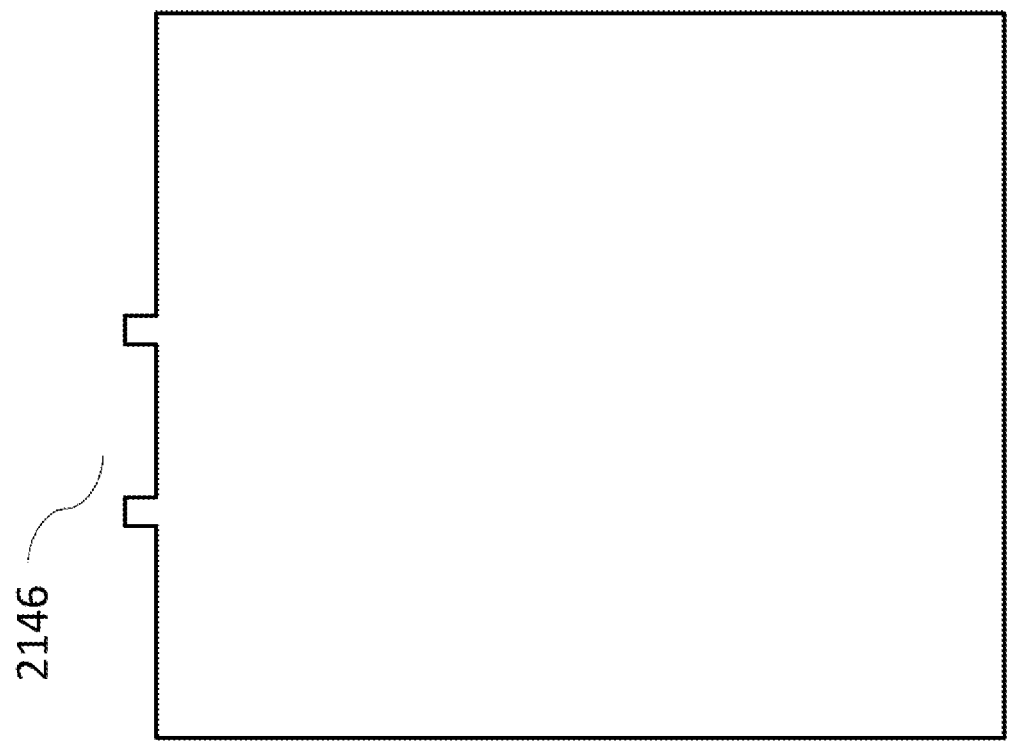
FIG. 21 is a schematic drawing of the third embodiment showing the reverse and lower edge of two different tiles, showing two possible combinations of protrusions.
Figure 21:
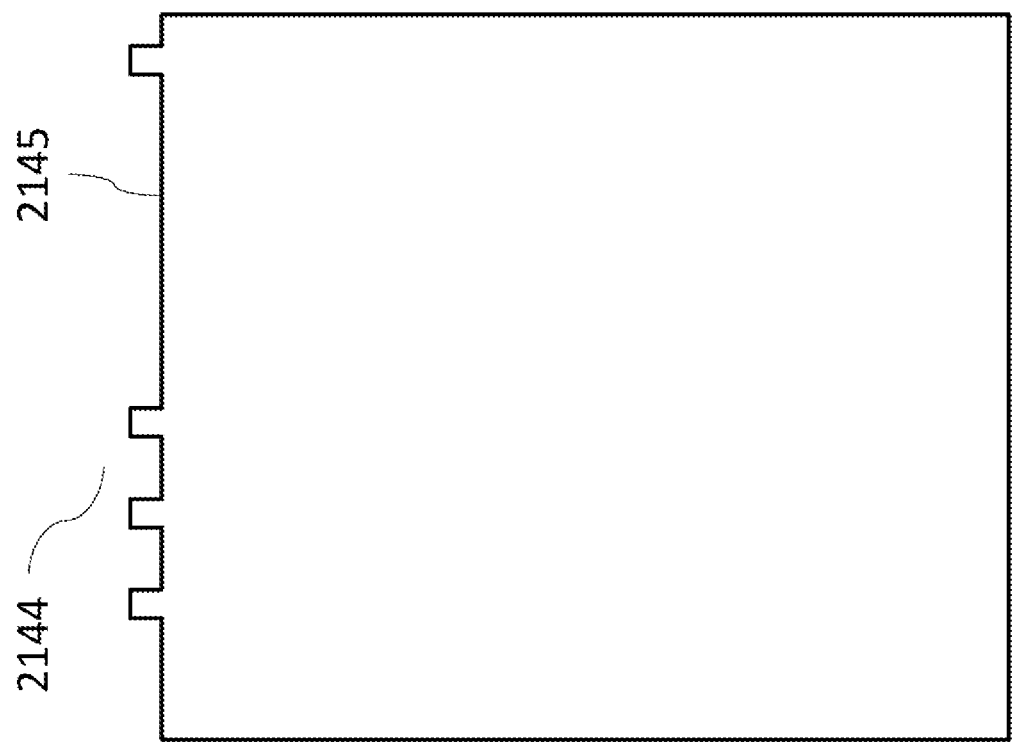

FIG. 17 is a schematic drawing of a physical input array 1710 of a third embodiment of the device 10 (FIG. 1) that may measure which tile 2145 (FIG. 21) is placed on the tile holder 1702 by measuring which pins 1732 are depressed by the protrusions on the tile 2144 (FIG. 21), 2146 (FIG. 21). The pins 1732 represent any physical depression/toggling of switches, for example, pogo pins, or other mechanical or electrical inputs 1710 to identify which tiles 2145 (FIG. 21) are being interacted with. The combination of pins depressed 2144 (FIG. 21), 2146 (FIG. 21) signals to a program which tile 816 (FIG. 8) has been placed the tile holder 1702. The touch of the user is measured, for example, by measures of capacitance or resistivity, changes in measures of capacitance or resistivity, or via visual data collected by a video and/or infrared camera 280 (FIG. 2), as the user interacts with each tile 816 (FIG. 8) by touching its conductive strip 1004 (FIG. 10), and signifies to the CPU 2458 (FIG. 24) when the files corresponding to each tile 330 (FIG. 3), 340 (FIG. 3), 350 (FIG. 3) should be played and/or displayed.

The most significant benefit of this embodiment is that the tiles may be made using only injection molded plastics, without the need for RFID tags or PCB's on or in each tile, thus this embodiment allows for a very low production cost. The drawback to this embodiment is that the mechanical nature of the tile identification mechanism is susceptible to mechanical failure.

Figure 18:
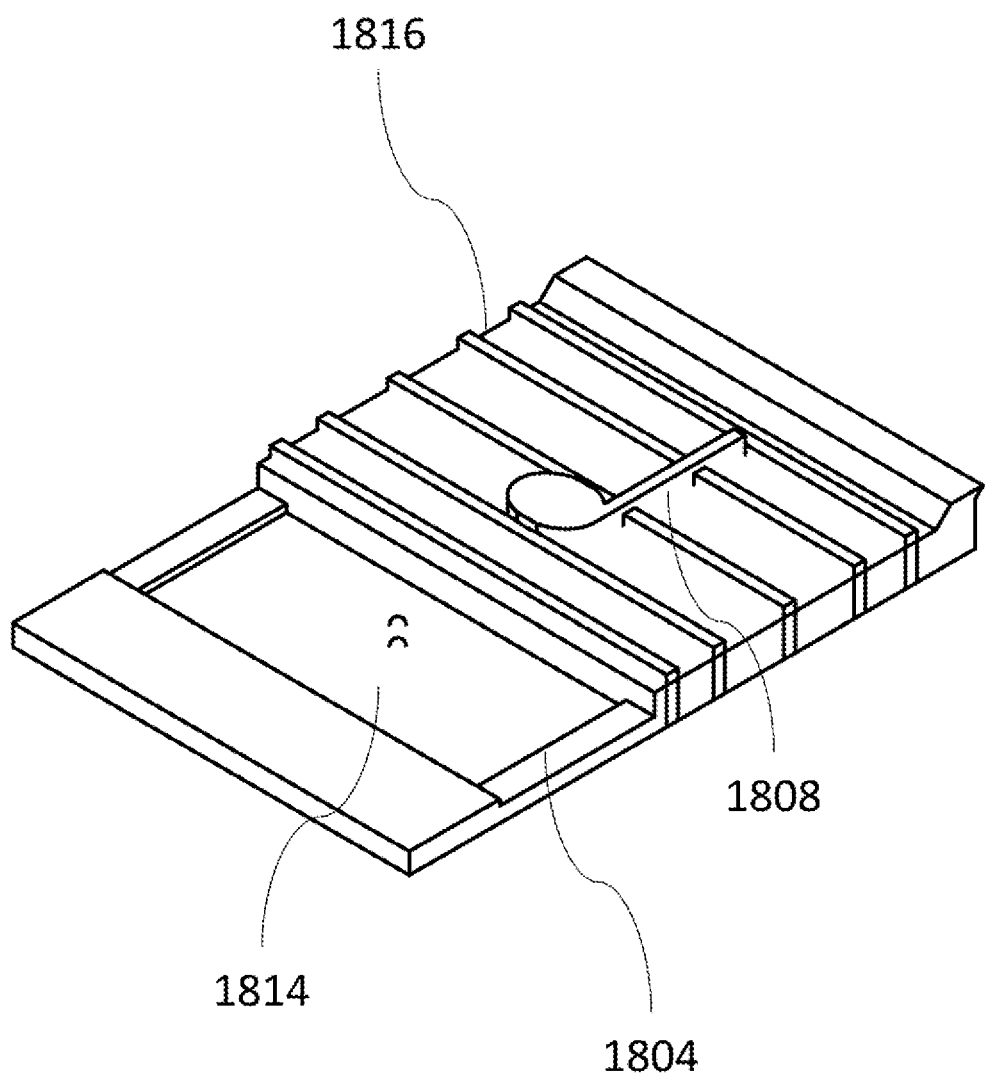
FIG. 18 is a schematic drawing of a tile showing an enlarged, tactile musical staff and note, and its corresponding braille music notation.

FIG. 18 is a schematic drawing of a tile 1816 showing an enlarged, tactile musical staff and note 1808, and its corresponding braille music notation 1814. Upon placing the tile 1816 in a slot 710 (FIG. 7) and touching the conductive portion 1804 of the tile 1816, the device 10 (FIG. 1) may play the tone of the note 1808, the name of the note 1808, the corresponding braille dot configuration 1814 of the note 1808, the solfege of the note 1808, or a combination or variation of these options, depending on the mode selected by the user.

Figure 19:
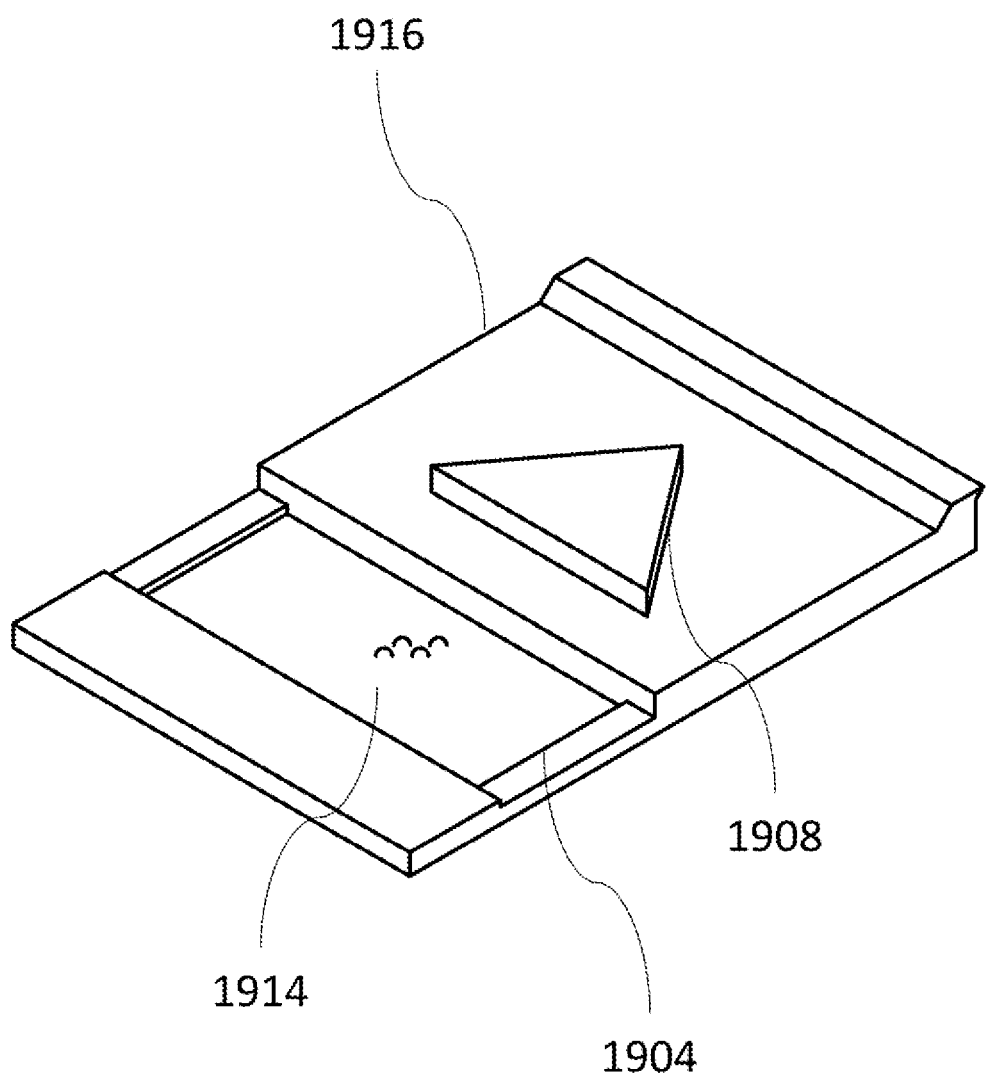
FIG. 19 is a schematic drawing of a tile showing an enlarged, tactile triangle, and its corresponding braille representation.

FIG. 19 is a schematic drawing of a tile 1916 showing an enlarged, tactile triangle 1908, and its corresponding braille representation 1914. Upon placing the tile 1916 in a slot 710 (FIG. 7) and touching the conductive portion 1904 of the tile 1916, the device 10 (FIG. 1) may play the name of the shape 1908, the corresponding braille dot configuration 1914 of the shape 1908, or a combination or variation of these options, depending on the mode selected by the user.

Figure 20:
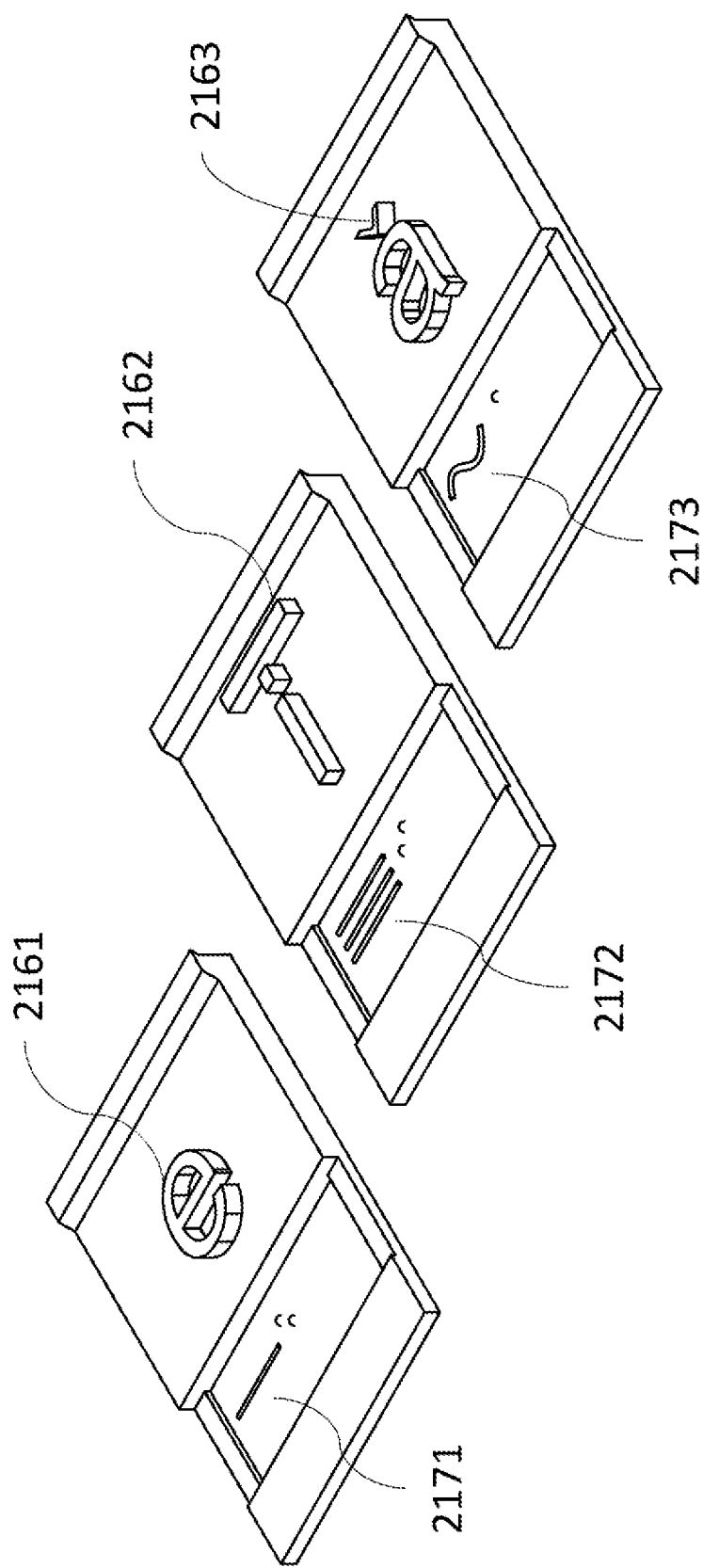
FIG. 20 is a schematic drawing of three tiles showing a system for tactilely categorizing and differentiating between consonants, short vowels, long vowels, and other phonetic categorizations.

FIG. 20 is a schematic drawing of three tiles showing a system for tactilely categorizing and differentiating between consonants 2508 (FIG. 25), short vowels 2161, long vowels 2162, and other phonetic categorizations 2163. The default tactile configuration for consonants 2508 (FIG. 25) is standard braille. Mastering consonant/vowel discrimination is important when learning phonics and literacy, and typical workbooks and manipulatives will present vowels and consonants in different colors: this technique is not useful to learners who are blind or color blind. Thus, a need for an analogous tactile system to tactilely differentiate between vowels and consonants is unaddressed. In the present system, a single horizontal line 2171 precedes the braille dots of a grapheme, to alert the reader that he or she is about to read a vowel or group of letters which contains a vowel. Similarly, conventions exist for visually discriminating between long 2162 and short 2161 vowels when learning phonics, and these conventions are similarly inaccessible to students who are blind. The present system further distinguishes long vowels by adding two additional horizontal lines, for a total of three horizontal, parallel lines 2172 preceding a long vowel. There are some instances in which there are commonly occurring graphemes which differ in pronunciation or articulation but do not vary in their orthographies, for example, 'hard c' as in 'can' versus 'soft c' as in 'cent'; 'a preceding a non-nasalized consonant' as in 'mat' versus 'a preceding a nasalized consonant' as in 'man': presently available print-based phonics systems rarely distinguish such sounds orthographically. The present system uses visual and tactile diacritics 2163 to orthographically distinguish such confounding graphemic representations, and horizontal curved or zig-zag lines 2173 to distinguish confounding graphemic representations tactilely in concert with braille.

FIG. 21 is a schematic drawing of the reverse of two different tiles 2145 from the third embodiment of the device 10 (FIG. 1), showing two possible combinations of protrusions 2144, 2146 which would depress different combinations of input pins 1732 (FIG. 17).

Figure 22:
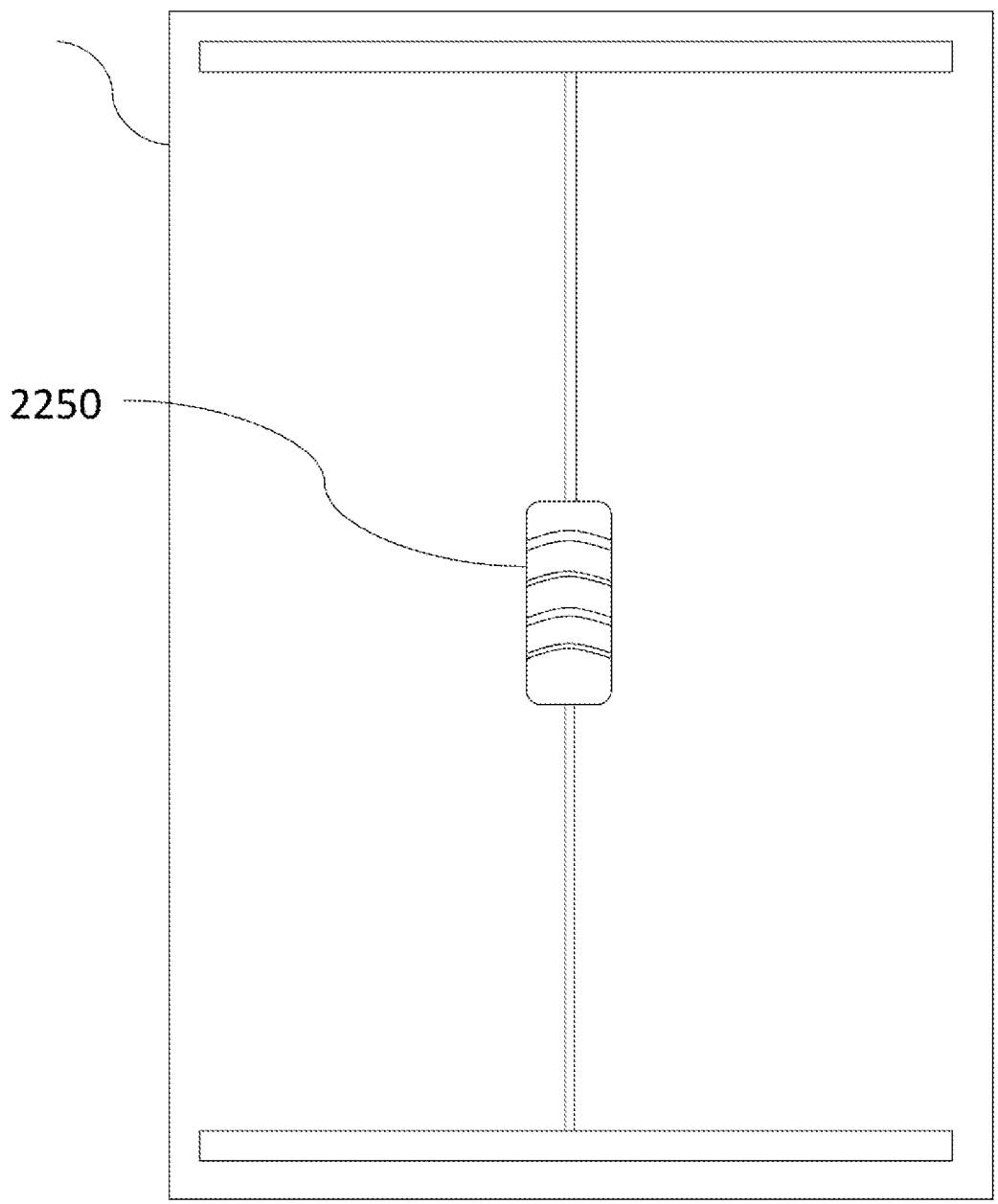
FIG. 22 is a schematic drawing of a fourth embodiment showing a resistor as a component in a circuit that will be completed by a tile.

FIG. 22 is a schematic drawing of a fifth embodiment of the current device 10 (FIG. 1) that has a resistor 2250 as a component in a circuit that is completed by a tile 2245. In this embodiment, a resistivity measuring component 1424 (FIG. 14) signals to the CPU 2458 (FIG. 24) the resistivity that is introduced to the circuit. The different resistor values and combinations of the resistor values 2350 (FIG. 23) correspond to different files associated each tile 2245, 2345 (FIG. 23).

Figure 23:
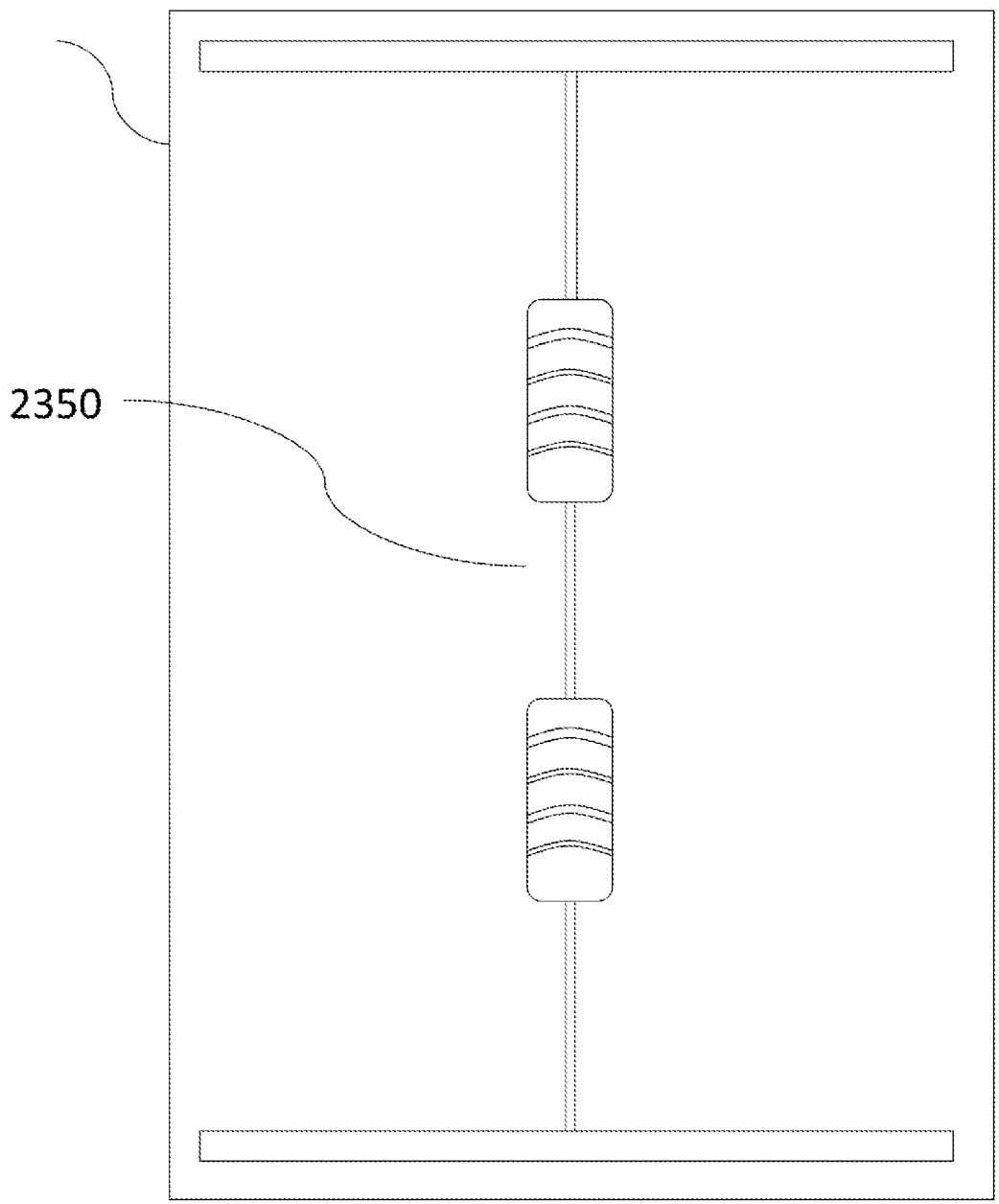
FIG. 23 is a schematic drawing of the fourth embodiment showing a different combination of resistors.

FIG. 23 is a schematic drawing of a different combination of resistors 2350 than that shown in FIG. 22.

FIG. 24 is a simplified schematic drawing of the wired components of the first embodiment. The device 10 (FIG. 1) uses a system, for example, capacitance 2420 or resistivity to identify that a user is interacting with a tile 2145 (FIG. 21) and another, or the same, system, for example, RFID 2410 reading, capacitance, resistivity, measure of change in resistance in a circuit, physical depression/toggling of switches, for example, pogo pins, or other mechanical 1710 (FIG. 17) or electrical 802 (FIG. 8) inputs to identify which tiles 2145 (FIG. 21) are being interacted with. This embodiment is exemplary because it allows for a more practical means of having the device identify the tile without the inconsistencies of relying on electrical contact of moveable, corrodible, malleable objects, while maintaining the salient user interaction of MTTI. In this embodiment, a capacitive touch sensor 2420 connected to the conductive portion 1610 (FIG. 16) of the tile holders 710 (FIG. 7) measures user interaction with tiles 2145 (FIG. 21), while an RFID reader 2410 multiplexed to multiple antennas 1666 (FIG. 16), or multiple RFID readers 2410 identify data stored on the tiles' RFID tags 1665 (FIG. 16). These inputs are processed by a processor 100 (FIG. 1), for example, a single-board computer, microprocessor, or microcontroller 2458, which has outputs to a display, for example, an LCD 2440, an audio amplifier 2432 which outputs to a speaker 2430, and a refreshable tactile display, for example, a refreshable braille display 2450.

Figure 25:
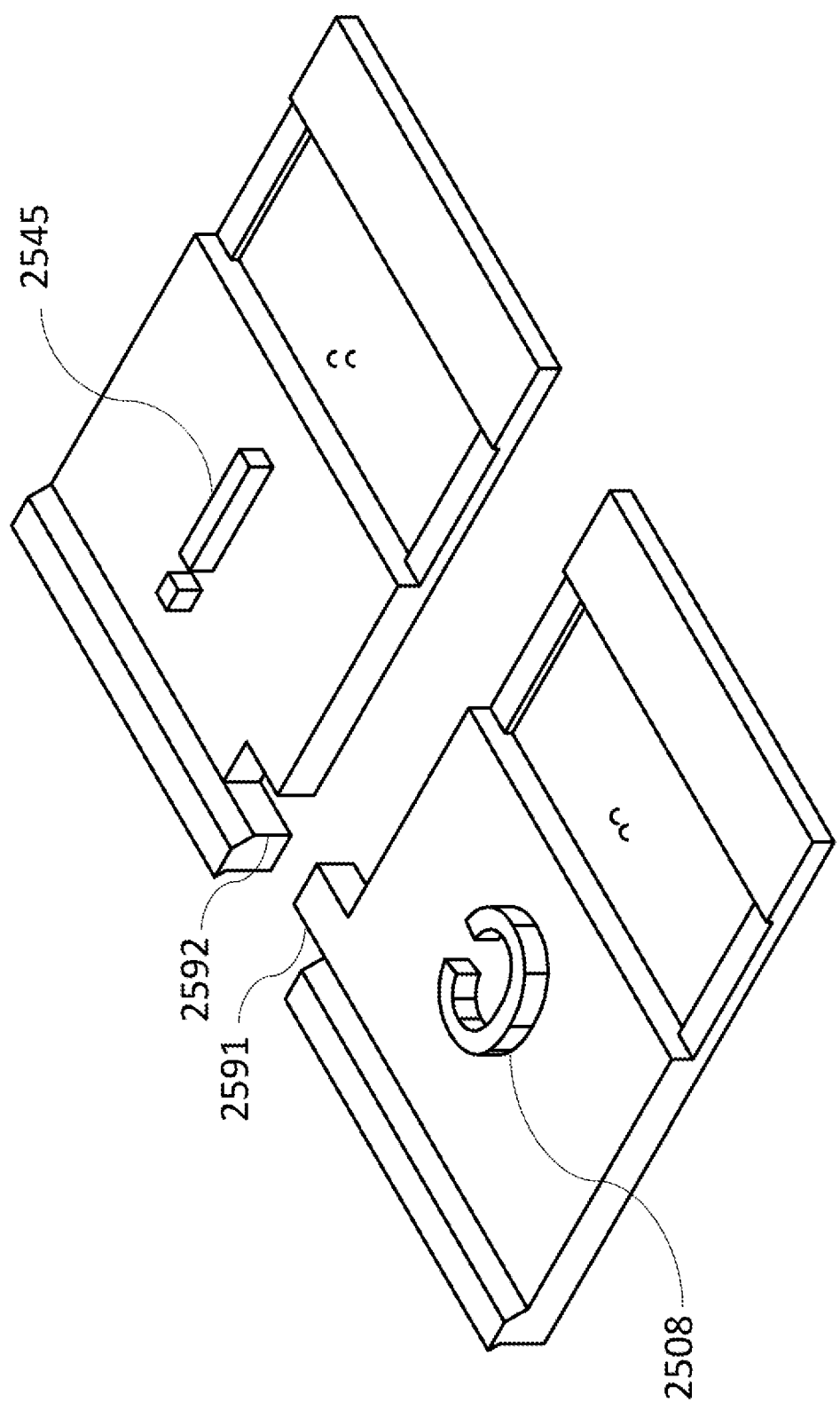
FIG. 25 is a schematic drawing of two tiles with corresponding concavities and convexities.

FIG. 25 is a schematic drawing of two tiles 815 (FIG. 8), one with representing 'soft c' 2508 with a convexity 2591, and the other representing 'short i' 2545 with a concavity 2592. A phonics rule states that 'soft c' may only be followed by 'short i' and 'short e', as in the words 'city' and 'cent'. By creating a convexity 2591 on the tile 815 (FIG. 8) with 'short c', it is able to be placed before tiles with concavities 2592 in the corresponding location. In this way, by assembling words in a puzzle-like fashion, with different shapes and positions of convexities 2591 and concavities 2592, users implicitly learn common phonics rules, for example, 'hard c' vs. 'soft c'; 'nasalized a' preceding only 'n' or 'm'; as well as others. The pieces may be designed in any way such that the user can differentiate pieces that are meant to be placed adjacent one another, for example, by matching adjacent edge colors, adjacent edge textures, or by other means.

FIG. 26 is a schematic drawing of a fifth embodiment showing a camera 2680 that can collect visual data to determine the identity of a tile 110 (FIG. 1) and when a user is touching a tile 120 (FIG. 1). The benefits of this embodiment are the elimination of the need for precise tile placement without adding to the production cost of the tiles, since these tiles need not contain PCB's. Negative aspects of this embodiment include the fact that the user's hands may occlude the view of the camera: adding additional cameras may mitigate this problem, but doing so adds to the already-increased cost of this embodiment.

Figure 27:
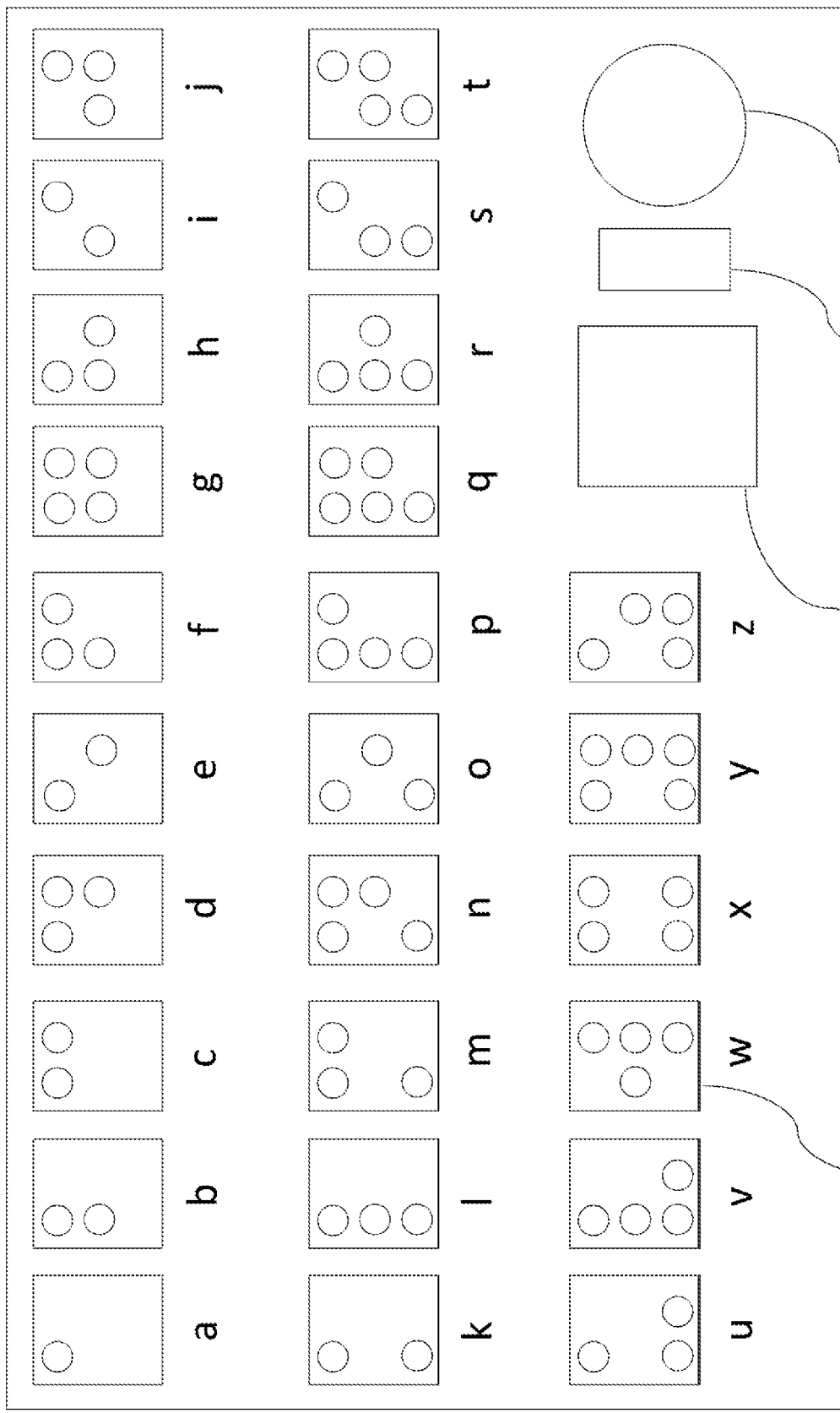
FIG. 27 is a schematic drawing of a sixth embodiment showing a single board PCB with a plurality of fixed, differentiable regions marked by graphemes and Braille that the user may interact with via touch.

FIG. 27 is a schematic drawing of a sixth embodiment showing a single board PCB 2781 with a plurality of fixed, differentiable regions 2704 on, in, or around a surface or object 2781, that may be marked by graphemes, numbers, symbols, text, Braille, pictures, musical notation, raised/embossed traces, and/or other visual, auditory, or tactile markers, that the user may interact with via touch 120 (FIG. 1), as measured by measures of capacitance and/or resistivity or measures of changes in capacitance and/or resistivity, or by other means, for example, by visual data collected by a video and/or infrared camera 280 (FIG. 2), and with or without further user action, the device performing an action, such as articulating an associated audio file or synthesized speech corresponding to either the letter names, letter sounds, articulating phonemes or words formed, corresponding braille notation of corresponding letters, numbers, objects, words, braille contractions, or symbols, verification of the veracity of an equation or expression, for example, a mathematical equation, expression, or inequality, verification of computer code, execution of computer code, playing of a musical note or notes, chord or chords, or melody or melodies, playing of a word, outputting braille or other tactile representation on a refreshable display, eliciting a visual output, or any other output that may be associated with the region or regions interacted with by the user. A fixed touch interface 2781 consisting of regions that may be differentiated by the user 2704 has the benefit of a lower manufacturing cost than the embodiments with moveable tiles, as additional tiles and sensors to measure them are not required. For this reason, a static touch interface with a single PCB 2781 that may itself be brailled or connected to conductive braille, with a simple injection molded housing to protect the PCB 2781, microprocessor 2700, onboard speaker 2730, and touch sensing hardware 2720 connected to the elements, may be the best option for scaling a braille, letter name, or phonics teaching device due to its low cost of production, and fully automatable assembly. A static touch interface consisting of regions that may be differentiated by the user has several associated drawbacks, for example, a user would be unable to form words to practice phonetic reading and spelling, the lack of physical manipulatives does not benefit children's fine and gross motor skill develop, and the user may begin to memorize the locations of different regions and rely on locational cues, which would hamper acquisition of the desired skills.

In accordance with an alternative embodiment of the invention, a system of interchangeable tiles 815 (FIG. 8), which may be arranged to form words, may be interacted with by sliding a mechanical slider switch, so that the corresponding visual and auditory articulations of the individual tiles and/or the word are elicited when the slider is proximal to the corresponding tile, thus mimicking the motion of tracking words/symbols/letters/phonemes while reading. The identity of the tiles may be identified by alternate means such as those in the above-described embodiments. This embodiment is not ideal as it is less salient for the user than MTTI.

In accordance with an alternative embodiment of the invention, is a set of tiles 815 (FIG. 8) with different embedded microcontrollers in each tile that are activated when grounded on the input portion of the device and interacted with by the user via touch, measured by changes in capacitance and/or resistivity.

In accordance with an alternative embodiment of the invention, is a set of tiles that the user interacts with via touch and is differentiated by the device by a heretofore unmentioned alternate physical, mechanical, or electrical means.

In accordance with an alternative embodiment of the invention, is a set of moveable, physical objects that may be marked by graphemes, numbers, symbols, text, Braille, pictures, musical notation, raised/embossed traces, and/or other visual, auditory, or tactile markers, that the user may place on or by a device, with the device identifying the tiles for example, by measures of capacitance and/or resistivity or measures of changes in capacitance and/or resistivity, or by other means, such as the physical depression of pins 1710 (FIG. 17) by protrusions in tiles 2144 (FIG. 21), 2146 (FIG. 21), that complete circuits to identify the tiles 815 (FIG. 8), or by automatic identification and data capture (AIDC), for example, radio-frequency identification (RFID) 710 (FIG. 7), bar code scanning, magnetic stripe readers, Optical character recognition (OCR), or integrated circuit card readers, or radio communication, for example, Bluetooth, and/or via visual data collected by a video and/or infrared camera 280 (FIG. 2), and with or without further user action, the device performing an action, such as articulating an associated audio file or synthesized speech corresponding to either the letter names, letter sounds, articulating phonemes or words formed, corresponding braille notation of corresponding letters, numbers, objects, words, braille contractions, or symbols, verification of the veracity of an equation or expression, for example, a mathematical equation, expression, or inequality, verification of computer code, execution of computer code, playing of a musical note or notes, chord or chords, or melody or melodies, playing of a word, outputting braille or other tactile representation on a refreshable display, eliciting a visual output, or any other output that may be associated with the objects placed by the user.

In the embodiments that do not require a visual display, energy use of the device is low compared to a tablet. Therefore, passive through charging allows the device to be used reliably in schools in rural areas where electricity is unreliable.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A device for teaching phonics, comprising:
a plurality of tiles, each tile comprising a grapheme and a touchable surface;
an interface array configured to receive at least one tile of the plurality of tiles;
a media output; and
a control device in electrical communication with the interface array and the media output comprising means configured to:
detect the at least one tile in the interface array;
identify a tile identifier associated with the at least one tile; and
convey the tile identifier to the media output,
wherein the control device further comprises means to detect a user touching the touchable surface of the at least one tile and the control device is configured to distinguish between a user touch and a user swipe of the touchable surface of the at least one tile, and
wherein the control device is configured and arranged to output, via the media output, an audio or video file corresponding to said grapheme of said at least one tile upon the user swiping said touchable surface of each of said at least one tile.

2. The device of claim 1, wherein each of said plurality of tiles further comprises a tactile formation corresponding to the grapheme.

3. The device of claim 2, wherein the tactile formation is selected from the group consisting of raised letters, raised braille letters and one or more horizontal, raised, straight or curved lines to distinguish visually and tactilely between graphemes.

4. The device of claim 1, wherein the tile identifier is selected from the group consisting of an audio file, a video file, and a tactile file.

5. The device of claim 1, wherein the control device is configured and arranged to detect a sequence of tiles in the array, and to detect and convey a sequence order corresponding to the sequence of tiles in the array to the media output.

6. The device of claim 1, wherein the symbol of each tile is selected from the group consisting of graphemes, phonemes, words, mathematical symbols, pictographs, linguistic concepts, mathematical expressions, musical notation, programmatic expressions, and non-linguistic concepts.

7. The device of claim 1, wherein the media output comprises one of the group consisting of an audio output, a video output, and a tactile output.

8. The device of claim 7, further comprising one of the group comprising an audio transducer connected to the audio output, a video display connected to the video output, and a refreshable tactile output display connected to the tactile output.

9. The device of claim 1, wherein the control device is configured and arranged to detect a capacitance and/or resistivity or change in capacitance and/or resistivity of at least one tile in the array.

10. The device of claim 1, wherein the control device further comprises means to detect the at least one tile in the array when a user touches the touchable surface of the at least one tile.

11. A method for operating a device for teaching phonics, comprising the steps of:
receiving into a tile holder a first tile of a plurality of tiles each comprising a grapheme and a touchable surface;
detecting the first tile in the tile holder;
identifying a first tile identifier associated with the first tile;
conveying the first tile identifier to a media output,
detecting a user touching a touchable surface of the at least one tile and distinguishing between a user touch and a user swipe of the touchable surface of the first tile, and
outputting an audio or video file corresponding to said grapheme of said at least one tile upon the user swiping said touchable surface of each of said at least one tile.

12. The method of claim 11, further comprising the step of detecting when a user touches the first tile in the tile holder.

13. The method of claim 11, further comprising the steps of:
receiving into the tile holder a second tile of the plurality of tiles;
detecting the second tile in the tile holder;

identifying a second tile identifier associated with the second tile; and conveying the second tile identifier to the media output.

14. The method of claim 13, further comprising the steps of:

detecting a sequence order of the first tile and the second tile in the tile holder; and conveying the sequence order to the media output.

15. A system for teaching phonics, comprising:

a plurality of tiles, each tile comprising a grapheme and a touchable surface;

a tile reading device, further comprising:

an interface array configured to receive at least one tile of the plurality of tiles;

a media output; and a controller in electrical communication with the interface array and the media output comprising means configured to:

detect the at least one tile in the array;

identify a tile identifier associated with the at least one tile; and convey the tile identifier to the media output; and a media rendering device in communication with the media output configured to receive and render the tile identifier, wherein the controller further comprises means to detect a user touching the touchable surface of the at least one tile and the control device is configured to distinguish between a user touch and a user swipe of the touchable surface of the at least one tile, and wherein the controller is configured and arranged to output, via the media output, an audio or video file corresponding to said grapheme of said at least one tile upon the user swiping said touchable surface of each of said at least one tile.

16. The system of claim 15, wherein the tile reading device further comprises means to detect a user touching the touchable surface of the at least one tile.

17. The system of claim 15, wherein the media rendering device further comprises one of the group comprising an audio transducer, a video display, and a refreshable tactile output display.

* * * * *